United States Patent [19]

Negoro et al.

[11] Patent Number: 5,568,642
[45] Date of Patent: Oct. 22, 1996

[54] COMPUTER SYSTEM WITH EASY PROGRAMMING ARCHITECTURE AND PROGRAMMING METHOD THEREFOR

[75] Inventors: Fumio Negoro, Yokohama; Tetsuri Murata, Tokyo; Kozo Sawamura, Kawasaki; Junichi Yuki, Sakura; Hiroshi Murai, Tokyo; Masayasu Onuki; Norihito Ito, both of Kawasaki; Wieguo Jiang, Tokyo; Masako Yonemura, Yokohama, all of Japan

[73] Assignee: Institute of Software Scientifical Constructions, Tokyo, Japan

[21] Appl. No.: 608,213

[22] Filed: Feb. 28, 1996

Related U.S. Application Data

[63] Continuation of Ser. No. 319,062, Oct. 6, 1994, abandoned.

[30] Foreign Application Priority Data

Dec. 26, 1991 [JP] Japan ................... 3-345563
Jul. 30, 1992 [JP] Japan ................... 4-203983

[51] Int. Cl.⁶ .................................. G06F 9/44
[52] U.S. Cl. ................ 395/700; 364/DIG. 1; 364/280; 364/280.4; 364/280.5
[58] Field of Search ............................. 395/700

[56] References Cited

U.S. PATENT DOCUMENTS

| | | | |
|---|---|---|---|
| 4,454,580 | 6/1984 | Poge et al. | 395/700 |
| 4,819,233 | 4/1989 | Delucia et al. | 395/700 |
| 4,839,851 | 6/1989 | Maki | 395/800 |
| 4,860,245 | 8/1989 | Kinoshita | 395/800 |
| 5,287,537 | 2/1994 | Newmark et al. | 395/800 |
| 5,291,611 | 3/1994 | Davis et al. | 395/800 |

*Primary Examiner*—Kevin A. Kriess
*Attorney, Agent, or Firm*—Barnes & Thornburg

[57] ABSTRACT

A new and useful computer system facilitates simplification of computer programs establishing a dedicated computer system adapted to a specific task, and makes it easy to program and to modify already established programs. The simple and easy method for establishing an application adapted dedicated computer system, operable on a plurality of data items for performing a plurality of functional processes for the data items, comprises the steps of establishing a plurality of program segments, each of to is exclusively assigned for one of the data items and has process content exclusively corresponding to one of the functional processes, and establishing a governing program for establishing systematic interrelationships between the program segments for performing a sequence of processes adapted to the dedicated application.

8 Claims, 8 Drawing Sheets

COMPUTER SYSTEM WITH EASY PROGRAMMING ARCHITECTURE AND PROGRAMMING METHOD THEREFOR

This application is a continuation of application Ser. No. 08/319,062, filed Oct. 6, 1994, now abandoned.

BACKGROUND OF THE INVENTION

1. Field of the Invention

The present invention relates generally to a computer system with a novel architecture facilitating programming of dedicated programs for various purpose. More specifically, the invention relates to a computer system which can establish programs easily adapted to later modification of program logic, processes, specifications and so forth. The present invention also relates to a method of programming according to the novel architecture.

2. Description of the Related Art

Ideal programming architecture should provide characteristics of high reliability, be easily understood, be effectively programmed, and be easily modified. A primary and most important task in the development of software is to stably and efficiently provide high quality programs. In general, to realize the ideal program, it is important to have suitable program structure, in which the overall program is hierarchically divided into a plurality of element groups having considerable independence, and respective elements must be configured into so-called aligned structure.

For accomplishing this task, various approaches have been attempted. As essential principles in designing programs, there have been introduced approaches of "modularization", "abstraction", "information hiding", and "localization". These principles have been discussed in various publications associated with software technologies, and need not be further discussed here.

Recognizing the effectiveness of modularization, abstraction, information hiding, and localization, some studies for practical application of those theories to practical program designs have been made and some typical processes have been developed.

(1) Modularization

Constitutes an effective method for designing a complicated system. The method divides the system into a plurality of portions for nominally reducing complexity (so-called "divide-and-conquer"). In modularization design, there have been various proposals for separation into proper modules and determination of the structures of the programs in the modules. In particular, the manner of division of the modules will become the important matter for evaluation of understandability, ease of modification, effectiveness and so forth.

(2) Hierarchical programming

The various methods for hierarchically establishing programs apply the theory of time sequence. Although there are some minor differences, structured programming, the stepwise detailing method, and top down programming may be considered to be included in this category.

(3) Abstract data is data independent of a realization method (data structure or algorithm for the data structure) and completely defined by its behavior. The behavior is defined by several operations established thereon. Since the portion realizing the abstract data and the portion utilizing the abstract data are associated only through the several operations, the locality is sufficiently high. The concept of abstract data has been developed in association with the study of structured programming or the module design method. Therefore, abstract data can be a means for dividing a problem while paying attention only to the solution's external behavior regardless of the internal structure of the data in program design. Also, programming employing abstract data can be easily verified and thus provides high reliability.

(4)

In the Jackson method, the program is designed as a data flow system constituted of a plurality of processes. No relationship in execution is established between the processes. Therefore, respective processes cooperate only through the data. In comparison with a functional dividing type module designing method, this method may easily increase the independence of respective portions. The Jackson method has been developed as a method for detailed design after division of the program. However, since it also proposes a method for structured program design, it can be said to be a unitary programming designing method.

The above-mentioned program designing technologies of course achieve certain objectives in theoretical study. However such methods cannot provide concrete and practical guidance for remarkably improving the productivity and quality of the programs for field engineers (system engineers) designing dedicated programs for specific operation, in the field. That is, the various designing method of the computer programs conventionally proposed still have a high degree of abstractness and therefore have been merely difficult theories.

Therefore, such programming methods may assist only a small number of high level engineers for enhancing their programming skill. Among field engineering in program designing, various problems remain unsolved and the conventional processes which give rise to such problems continue to be performed by most programming engineers. Namely, since various programming engineers having different levels of knowledge and skill generate programs with their own styles and habits, the quality of the programs varies significantly, causing serious problems in management of the systems. Also, depending upon the size of the system, reduction in productivity becomes a significant problem.

On the other hand, in a dedicated system specifically adapted to a specific task or tasks, such as machine control, machine or industrial system designing, trade management, production management, stock management, supply management, finance management, or personnel management, for example, modification of the specification of the programs or details of the programs at various stages of programming operation frequently becomes necessary. In many cases, programming, even detailed program design or practical programming operation, is started while some factors remain uncertain or undetermined. Such uncertain factors are studied during programming operation. If some problem is found with respect to the uncertain factors, the program specification and/or the detailed designs of the programs are modified to solve the problem. Such modification can influence various portions of the programs and thus requires additional analysis of the overall on-going programs to find the portion affected by the modification. This frequently requires review of the entire programs in the systems to fix or adapt the affected portions to the necessary modification. The somewhat bottom-up and redundant program designing operation clearly lowers the productivity of programming and somewhat lowers the reliability of the entire system. Furthermore, such later adaptation or modification of the programs tends to increase complication of the program and to lower mutual independence of the programs in the system.

SUMMARY OF THE INVENTION

The present invention is intended to solve the problems in the prior art, as set forth above, and propose a new and useful architecture in computer design and programming.

Therefore, it is an object of the present invention to provide a new and useful computer system which facilitates simplification of computer programs, establishing a dedicated computer system adapted to a specific task, whereby programming and modifying the already established programs are easier.

Another object of the invention is to provide a new and useful, and widely applicable program structure which is applicable in establishing dedicated computer systems, such as for machine control, machine or industrial system designing, trade management, production management, stock management, supply management, finance management, and personnel management.

A further object of the invention is to provide a method for establishing a computer software system according to the new and useful architecture in the computer system of the invention.

According to one aspect of the invention, a computer system for establishing an application adapted dedicated system operable on a plurality of data items for performing a plurality of functional processes for the data items, comprises:

an arithmetic means for performing processes defined by an on-going program describing a manner and schedule of signal processing;

a memory means for storing a plurality of information, the memory means including a first storage means for storing a plurality of program segments, each of the program segments having an elemental single process which can be completed through execution of the corresponding program segment and a unique identifier thereof, and being executable independent of other program segments for completely performing the contained elemental single process, and a second storage means for storing at least one governing program for systematically establishing interrelationship between respective ones of the program segments for sequential operation thereof required in a target source program; and means for triggering the governing program for systematic execution of the target source program by executing respective ones of the program segments by the arithmetic means in a manner governed by the governing program.

According to another aspect of the invention, a computer system for establishing an application adapted dedicated system operable on a first data item and a second data item for performing a functional process for respective of the first and second data items, the functional process being constituted of a sequence of first and second elementary processes each essentially including a single self completing process, comprises:

an arithmetic means for performing processes defined by an on-going program describing manner and schedule of signal processing;

a memory means for storing a plurality of information, the memory means including a first storage means for storing a plurality of program segments, each of the program segments having an identifier for identifying one of the first and second data items and containing one of the first and second elemental processes which can be completed through execution of the corresponding program segment and a unique identifier thereof, and being executable independent of other program segments, and a second storage means for storing at least one governing program for systematically establishing interrelationships between respective ones of the program segments for sequential operation thereof for performing the functional process for completely performing the contained elemental signal process; and means for triggering the governing program for systematic execution of respective ones of the program segments by the arithmetic means in a manner governed by the governing program for performing a sequence of processes required in a target source program.

In the preferred construction, the first and second data items correspond to data items in a data file to be handled. Also, the first elementary process may be one of a data check process, a data write in process, an arithmetic process, and so forth.

According to a further aspect of the invention, a computer system for establishing an application adapted dedicated system operable on a first data item and a second data item for performing a functional process for respective ones of the first and second data items, the functional process being constituted of a sequence of first and second elementary processes each of which have possible minimum processing step, comprises:

an arithmetic means for performing processes defined by an on-going program describing manner and schedule of signal processing;

a memory means for storing a plurality of information, the memory means including a first storage means for storing a plurality of program segments, each of the program segments having an identifier for identifying one of the first and second data items and containing one of the first and second elementary processes which can be completed through execution of the corresponding program segment and a unique identifier thereof, and being executable independent of other program segments, and a second storage means for storing at least one governing program for systematically establishing interrelationships between respective ones of the program segments for sequential operation thereof for performing the functional process for completely performing the contained elementary signal process; and means for triggering the governing program for systematic execution of respective ones of the program segments by the arithmetic means in a manner governed by the governing program for performing a sequence of processes required in a target source program.

According to a still further aspect of the invention, a method for establishing an application adapted dedicated computer system, operable on a plurality of data items for performing a plurality of functional processes for the data items, comprises the steps of:

establishing a plurality of program segments, each of which contains a single process to be completed through execution of the corresponding program segment without requiring execution of any other program segment, and a unique identifier thereof; and establishing a governing program for establishing systematic interrelationships between the program segments for performing a sequence of processes adapted to a targeted dedicated application to be executed by said dedicated computer system.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for illustration and understanding only.

In the drawings.

In addition to the drawings set out above, an explanatory and illustrative program list showing one example of a practical program written in COBOL is appended as an appendix for facilitating better understanding of the invention.

DESCRIPTION OF THE PREFERRED EMBODIMENT

Figure 1:
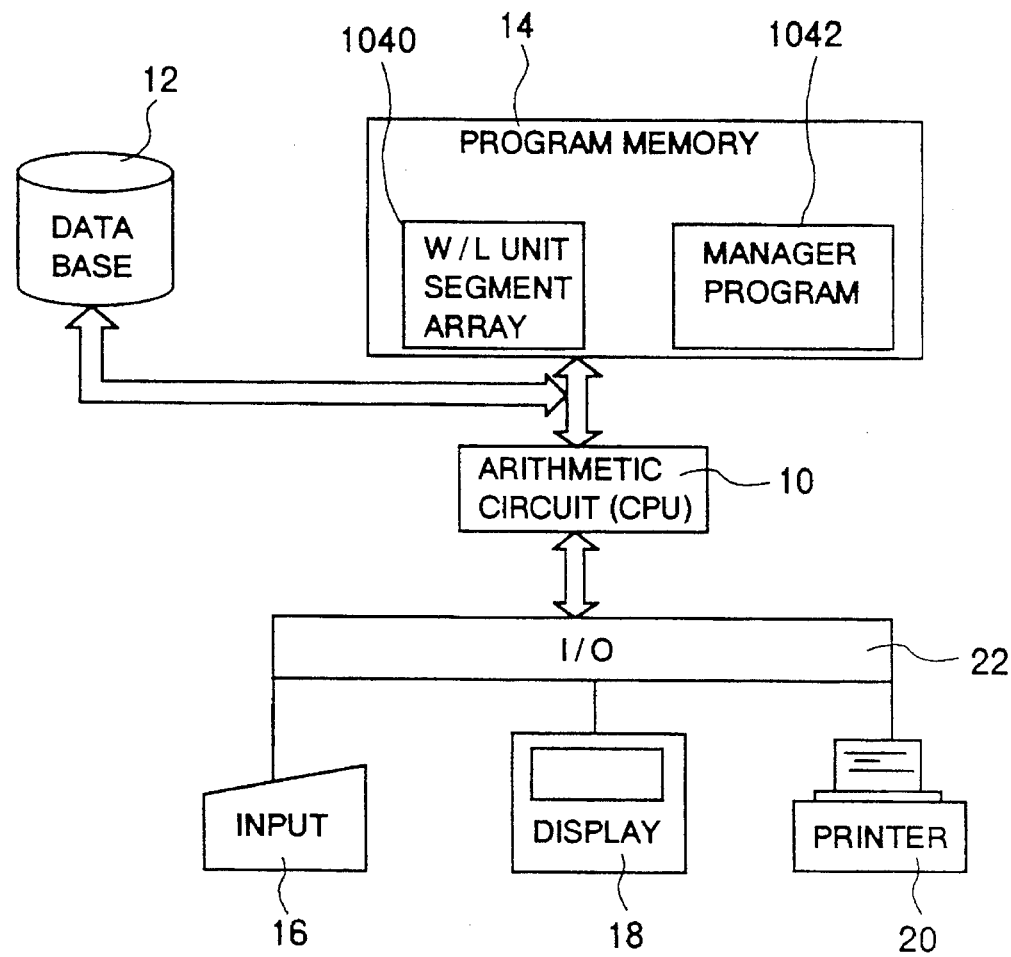
FIG. 1 is a schematic and explanatory block diagram of a computer system according to the present invention.

Referring now the drawings, particularly to FIG. 1, the preferred embodiment, a computer system with a novel and unique architecture for easy programming, includes an arithmetic circuit 10 which generally comprises a central processing unit (CPU). As in the standard known computer system, the arithmetic circuit 10 is connected to memories forming a data base 12 and a program memory 14. Also, the arithmetic circuit 10 is connected to various peripheral devices, such as an input device 16, such as a key board, scanner, digitizer, touch panel or so forth, a display unit 18, a printer 20, a plotter, a remote terminal, a host computer or so forth, via an input/output (I/O) unit 22. As can be appreciated, the shown computer system can be realized in any of the computer systems which are provided with the capability to read/write data, process data and so forth.

The shown embodiment of the computer system is distinguished from any previously known computer systems in the architecture in programming and executing programs. For this purpose, the program memory 14 in the shown embodiment incorporates a word/logic (W/L) unit segment array 1040 and a manager program storage 1042. The W/L unit segment array 1040 is designed for storing a plurality of word/logic unit segments which will be discussed later in detail. The manager program storage 1042 stores one or more manager programs which govern behavior of each W/L unit segment and will be discussed later.

For fully understanding the architecture employed in the present invention, it is extremely important to fully understand the concept of the W/L unit segment employed in the present invention. In general, the W/L unit segment is considered as a possible shortest or simplest program established for processing a specific word. The term "word" as used throughout the disclosure represents any predetermined data or data sequence of a predetermined number of digits. Also, the term "word" may be representative of a name given for a specific process.

Figure 2:
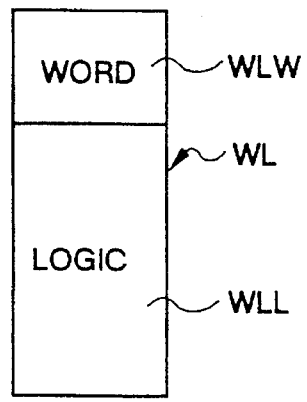
FIG. 2 is an explanatory illustration showing general structure of a word/logic (W/L) unit segment employed in the architecture of the shown embodiment of the computer system according to the present invention.

As can be appreciated, a program sequence for accomplishing necessary processes for a specific word requires a plurality of individual processes, such as checking data, performing (an) arithmetic operation(s), reading out, writing in or so forth. In the normal or conventional computer programming technology, these processes are established as a sequence of or a single series of programs inherently associated with each other such an extent that a modification in one process may influence other processes to such an extent as to require associated modification thereof. The W/L unit segment employed in the present invention is quite distinct from such conventional architecture of the computer system. As shown in FIG. 2, the W/L unit segment WL includes a word data area WLW which stores the specific word assigned therefor, and a logic data area WLL storing a specific, simple and essentially single process to be performed with respect to the assigned word. A plurality of W/L unit segments WL is established in terms of one specific word to accomplish all necessary processes for the specific word.

For example, assuming that the specific word assigned is 5 digit character, data items associated with the word are a date, number, human perceptive name identification (character), classification (number, character or possibly combination thereof), and the required processes are an attribute check of input data identifying the word, a digit number check of the input data identifying the word, a consistency check between the assigned word and the input data, an arithmetic operation on the selected data item with the selected data item of another word, an arithmetic operation on the selected data with a selected internal data, an arithmetic operation on the selected data item with a selected internal data of another word, and storing the data item or the result of an arithmetic operation in the database, the W/L unit segment is established for each required process in terms of the assigned word. Therefore, in the foregoing example, seven W/L unit segments respectively for the attribute check of input data identifying the word, the digit number check of the input data identifying the word, the consistency check between the assigned word and the input data, the arithmetic operation on the selected data item with the selected data item of another word, the arithmetic operation on the selected data with the selected internal data, the arithmetic operation on the selected data item with the selected internal data of another word, and storing the data item or the result of an arithmetic operation in the database, are established. The W/L unit segments thus established are stored in the W/L unit segment array 1040 in terms of the assigned words for assessing in terms thereof, as shown in FIG. 3.

Figure 3:
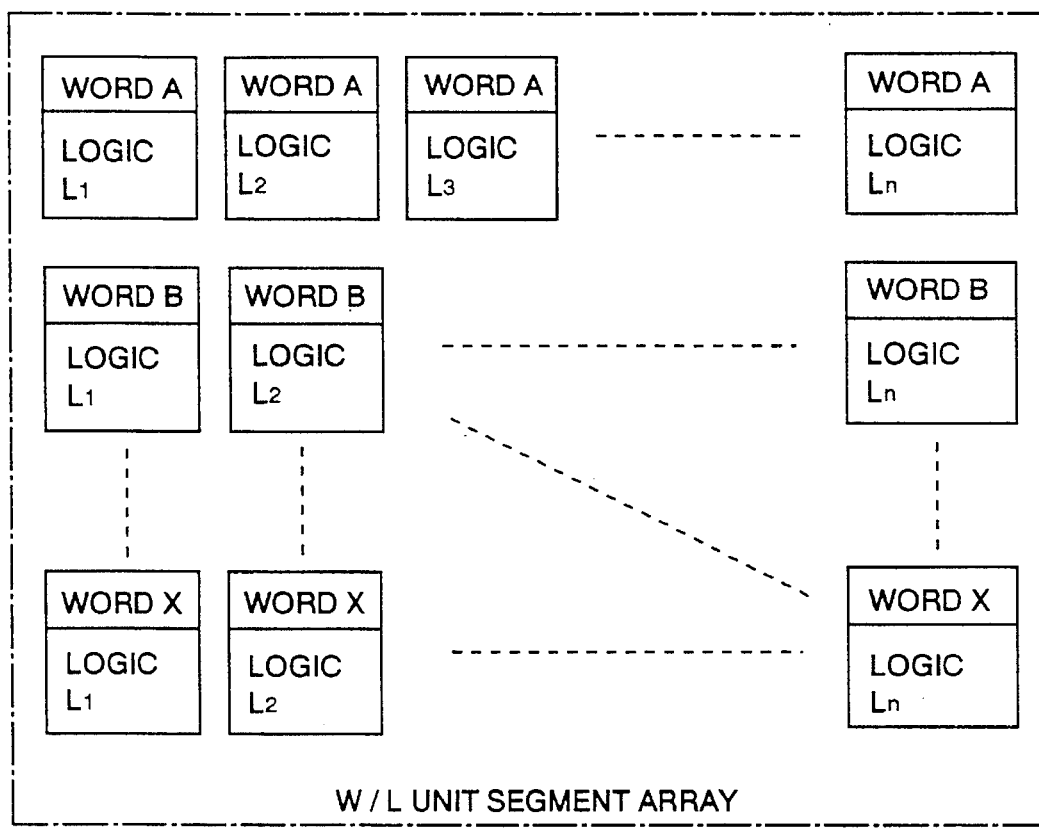
FIG. 3 is an explanatory illustration showing imaginary arrangement of the W/L unit segments in a word/logic unit segment array employed in the computer system of FIG. 1.

It should be noted that the illustration in FIG. 3 is simply for illustration. In the example of FIG. 3, each W/L unit segment can be executed in the arithmetic circuit 10 independently of other W/L unit segments established with respect to the words A, B, ... X. Also, for respective words A, B, ... X, logic operators $L_1, L_2 ... L_n$ are combined for establishing respective W/L unit segments.

Figure 4:
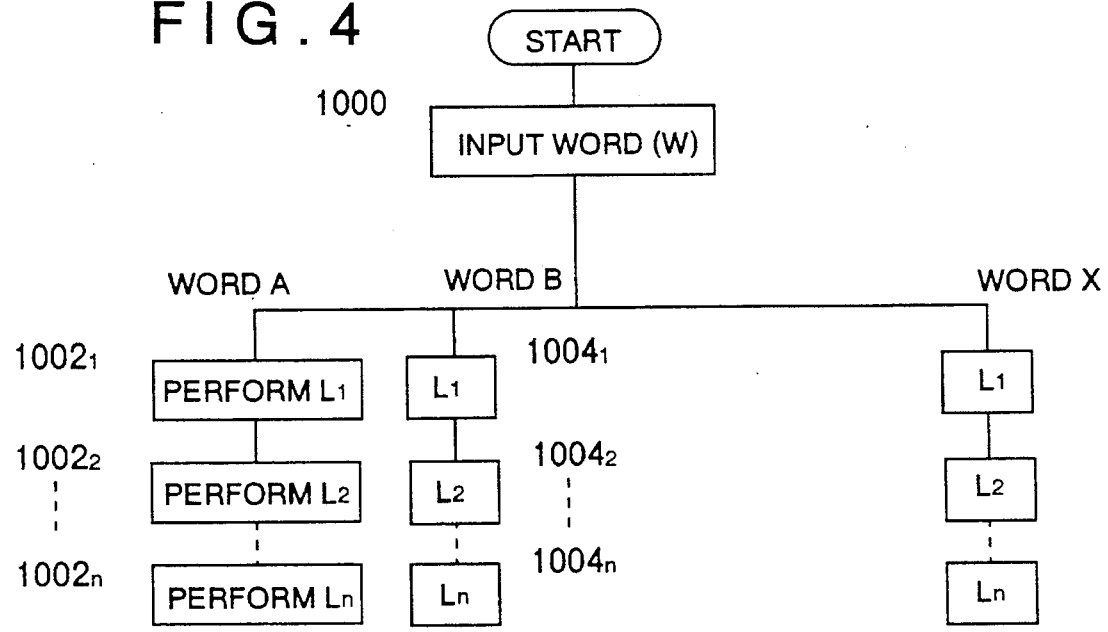
FIG. 4 is an explanatory flowchart showing process performed by a manager program governing execution of respective W/L unit segment.

FIG. 4 shows an example of the manager program governing the behavior of a respective W/L unit segment WL. As shown, the manager program is responsive to an input of the word W at a step 1000. Then, depending upon the input word and the data items associated therewith, the manager program sequentially triggers the W/L unit segments associated with the input word according to a predetermined order. Namely, when the input word is A, the processes $1002_1$ to $1002_n$ are performed. Similarly, when the input word is B, the processes $1004_1$ to $1004_n$ are performed sequentially.

As can be seen herefrom, since the manager program is required to govern only the order of execution of the W/L unit segments associated with the specific input word, it can be simple enough to be easily understood and modified. Also, as set out above, since the logic in each W/L unit segment contains the simplest possible form of process, each individual W/L unit segment can be simple enough to be easily understood and modified.

Practical application of the shown embodiment of the architecture of the program to be established on the shown embodiment of the computer system will be discussed herebelow with reference to FIGS. 5 to 10.

Figure 5:
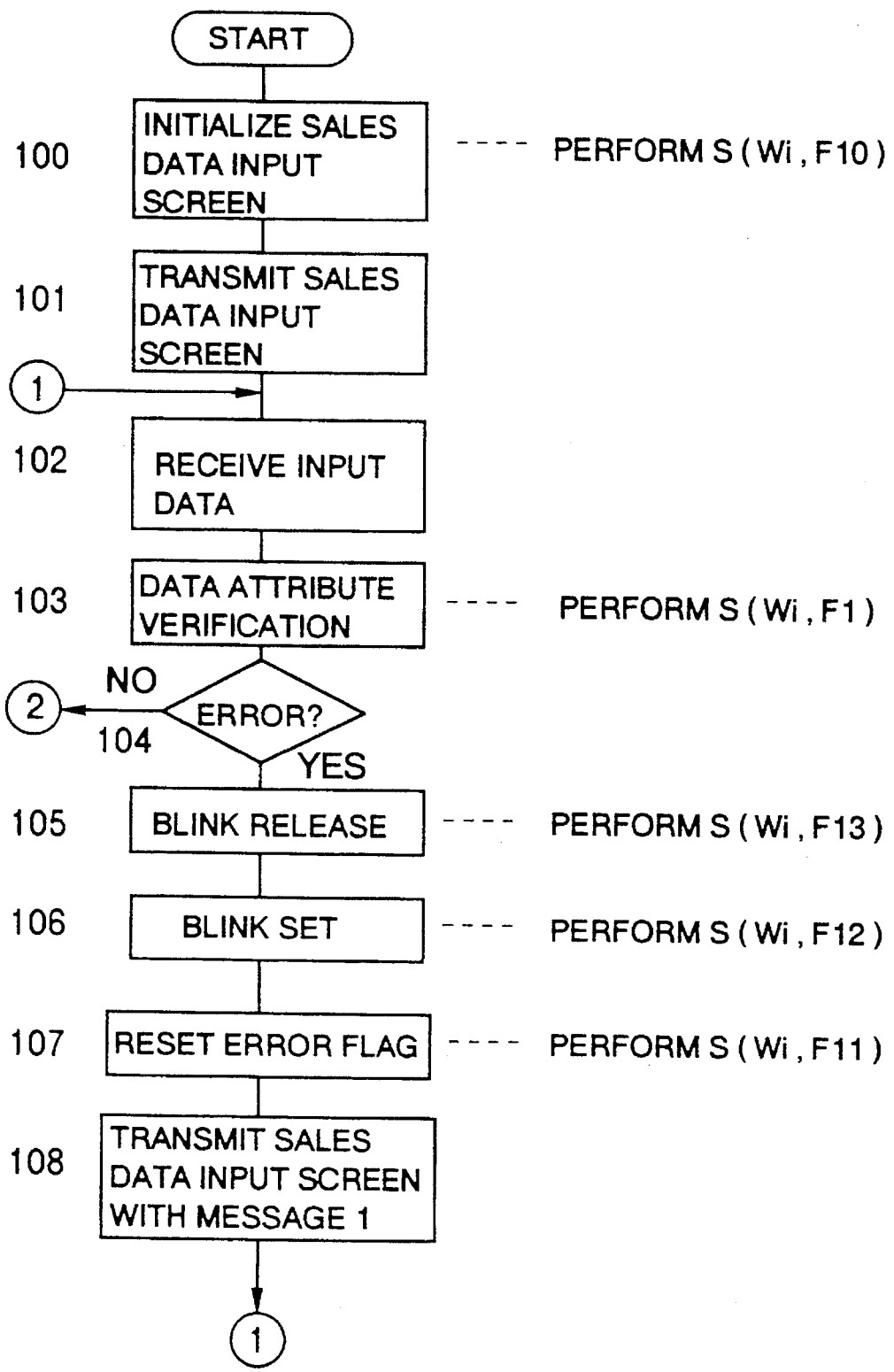
FIGS. 5 to 7 show a sequence of flowchart showing examples of the manager program applicable for a dedicated trade management system.
Figure 6:
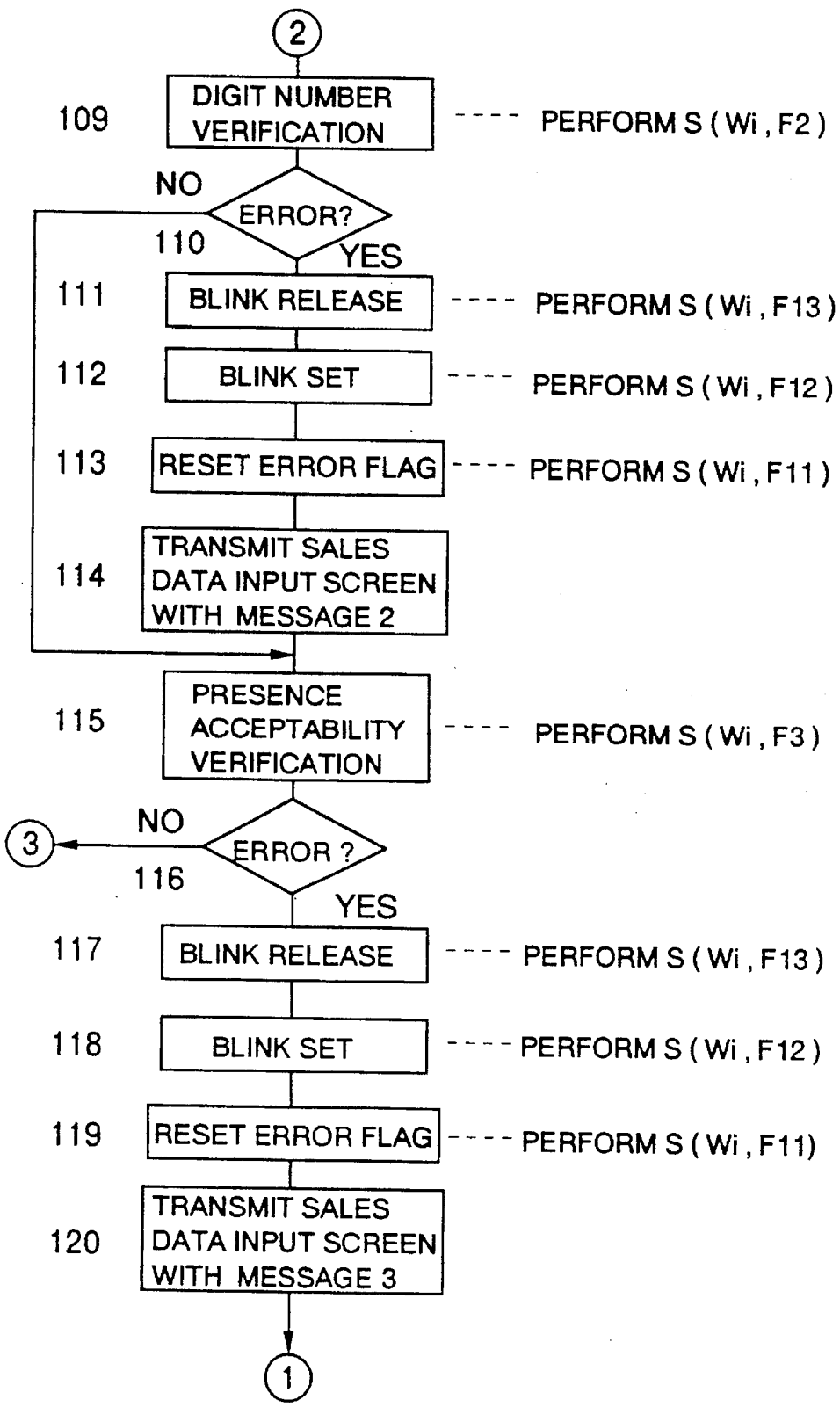
Figure 7:
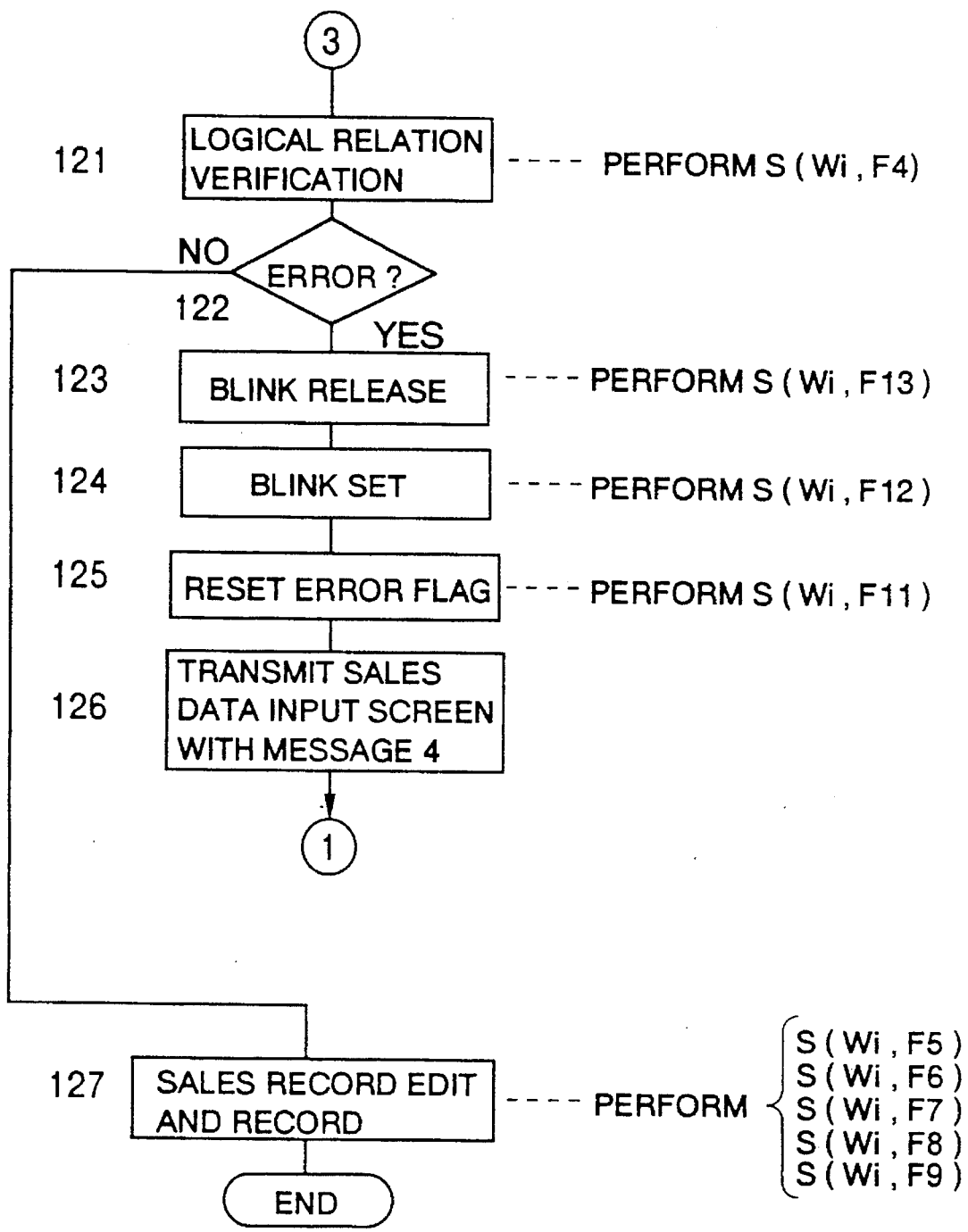

FIGS. 5 to 7 illustrates the application of the shown embodiment of the computer system for a trade management system. For simplification of the disclosure, it is assumed that the shown trade management system has a required specification to perform the following functions:

a) to display a sales data input screen image on the display 18 to receive data input;

b) to verify the input data;

c) if the result of verification is OK, the input data is written in a sales file established in the database 12;

the processes of a) to c) form a sales data collection process, d) to display an operation screen image to receive an input of a sales data collection date; and e) to edit information up to the sales data collection date for printing a ledger or a slip, the processes of d) and e) form a ledger generation process.

It is further assumed that, in the demanded specification, the following ten data items are to be included in the sales input screen and a sales record in the sales file.

W1: Sales Date W2: Goods Code
W3: Goods Name W4: Unit Price
W5: Amount W6: Total Sales
W7: Ground Total W8: Shop Code
W9: Shop Name W10: Number of Sales In the shown example, each of W1 to W10 is regarded as a "word" assigned for the targeted trade management system. As set forth above, with respect to the foregoing ten words Wi (i=1 to 10), the W/L unit segments perform the following nine functions:

F1: verification whether the attribute of the input data is consistent with the attribute of the corresponding word;

F2: verification whether the number of digit of the input data is within a predetermined number of digits;

F3: verification whether the input data satisfies a predetermined condition defined by definition information of the corresponding word;

F4: verification whether a predetermined condition in the logical relationship between the input data and the predetermined other data item is satisfied;

F5: storing of the input data of the word to a predetermined portion in a memory, e.g. database;

F6: storing of an internal data of the word to a predetermined portion in the memory;

F7: performing a predetermined arithmetic operation on the input data of the word and the predetermined input data of another word and storing the result of the arithmetic operation in the predetermined position of the memory;

F8: performing a predetermined arithmetic operation on the input data of the word and the internal data of another word and storing the result in the predetermined position in the memory; and F9: performing a predetermined operation on the internal data of the word and the internal data of another word and storing the result in the predetermined portion in the memory.

As set forth above, the W/L unit segments established with respect to respective combination of the words and the process are mutually independent of each other. Respective W/L unit segments thus established will be hereafter identified by S(Wi, Fj (j=1 to 9)). Further discussion will be given for respective functions set out above, in terms of examples of the W/L unit segments established thereon.

F1: Attribute Verification

The W/L unit segment established for this function is for checking and verifying that the input data of the specific word Wi has the predetermined data attribute. For instance, when the specific word is W3 corresponding to the goods name as a sequence of characters, verification is performed whether the input data has the attribute of a sequence of characters. It should be noted that though the discussion here describes the verification whether the input data has the character attribute, it may be possible to specify the character type, such as Roman character, Greek character, Chinese character or so forth in the attribute verification. When the attribute of the input data is consistent with that of the corresponding word, the input data is presumed to be valid and otherwise, the input data is regarded as invalid.

In a similar manner, the attribute verification function is coupled or associated with respective words for establishing the W/L unit segments S(Wi, F1). However, for the word(s) which do(es) not require attribute check, the W/L unit segment will not be established.

Typically, the attribute verification as the logic in the W/L unit segment is performed to initially receive the input data of the corresponding word, and to check the attribute of the received input data. Checking the attribute per se can be done by any known processes. When the attribute of the input data is coincident with that of the corresponding word, the process is successfully terminated. On the other hand, when the attribute of the input data is inconsistent with that of the corresponding word, then an error flag E(Wi, F1) indicative of failure of attribute verification is set. Thereafter, the process is abnormally terminated.

F2: Digit Number Verification

This function (logic) is adapted to check or verify the input data in terms of the number of digits of the input data. For instance, when the sales date (W1) is two digit numerical data representative of the day of month, the input data should not be more than two digits. Therefore, when the W/L unit segment has the specific word W1 and the specific function (logic) F2, the corresponding input data should have one or two digits. Therefore, when the input data has two or less digits, such input data can be presumed to be correct and thus valid. On the other hand, when the input data has three or more digits, judgement can be made that the input data is not valid. Similar processes or functions for checking or verifying the number of digit of the input data in terms of the corresponding word, are performed by respective ones of the W/L unit segments S(Wi, F2).

Similarly to the foregoing attribute verification function of F1, the W/L unit segment will not be established when the word does not require verification of the number of digits of the input data.

In the practical process of digit number verification, the input data of the specific word is received and checked against a predetermined digit number given for the corresponding word. When the digit number of the input data is smaller than or equal to the given digit number, the input data is presumed to be valid. On the other hand, when the digit number of the input data is greater than the given digit number, then the input data is regarded as invalid. In this case, an error flag E(Wi, F2) is set to indicate failure of verification of the digit number of the input data.

F3: Presence Acceptability Verification

This function or logic is for checking whether the data of the specific word Wi is present in an identification table which is designated by the data of the specific word. The identification table may be generated in a master file, a common table or self-holding table or so forth in the database or the program memory depending upon the content of the process to be done.

For instance, in case that the word Wi or W2 corresponding to the goods code, all possible valid goods codes are collectively stored in the identification in the common table. The W/L unit segments S(Wi, F3) for this function perform checking of the input data of the corresponding word Wi against the content of the common table by seeking the consistent data item, such as the goods code, therein. When the consistent data item is found in the common table, such input data is presumed to be valid and is otherwise regarded as invalid.

Similarly to the foregoing functions of F1 and F2, the W/L unit segment will not be established when the word does not require presence acceptability verification of the input data.

The following is the typical process to be performed by the W/L unit segment S(Wi, F3). In conjunction with receiving the input data of the specific word, the identification table is read out. The input data is compared with respective content of the identification table to find or seek the data item in the identification table consistent with the input data. If such search operation is successful to find the consistent data item, the input data is presumed to be valid, and otherwise is regarded as invalid. In such case, an error flag E(Wi, F3) is set to indicate failure of the presence acceptability verification.

F4: Verification of Logical Validity between Data

This function is for verification of the input data of the specific word having a predetermined logical relationship with the data of predetermined other item or items satisfying a predetermined condition. Such function is thus used for avoiding illogical input data in connection with the data of the other item having the predetermined relationship with the input data.

For instance, in the case of the total sales (W4), it has a logical relationship in that the input data value has to be consistent with a product of the unit price and the number of units. Therefore, in this case, the input data of the word W4 is compared with the product of the unit price and the number of units for verification. When the input data is consistent with the product, it is verified as valid and otherwise regarded as invalid. Respective ones of the W/L unit segments S(Wi, F4) associated with the function F4 are adapted to perform the similar logical relation verification. However, if the word does not require such logical relationship verification, the W/L unit segment for the corresponding word will not be established.

The F4 function performs the logical relationship verification with respect to the input data for the specific word in the following manner. Initially, the input data of the specific word is received. At the same time, the data of the predetermined item, to which the input data has to have a given relationship if the input data is normal, is obtained. The input data is then compared with the obtained data of the other item. If the given relationship between the input data and the obtained data is established, the input data is judged as valid data and, otherwise as invalid data. When the input data is judged as invalid, a corresponding error flag E(Wi, F4) is set as in the above-discussed functions.

F5: Input Data Registering Process

The W/L unit segment S(Wi, F5) performs the function F5 for storing the input data of the corresponding word Wi to corresponding portions of the self-holding table AT, the common table CT, the master file MF, a data file DF or so forth. If the word does not require the process for storing in a memory, the W/L unit segment S(Wi, F5) for the corresponding word is not established.

F6: Internal Data Transferring Process

The W/L unit segment S(Wi, F6) for the function F6 is adapted to transfer for copying or moving the internal data (data stored in the self-holding table AT, the common table CT, the master file ME, the data file DF or so forth) of the corresponding word to another designated portion of one or more of the self-holding table AT, the common table CT, the master file MF, or the data file DF. Similarly to the W/L unit segments in other functions set forth above, no W/L unit segment is established for the word which does not require the internal data transferring process.

F7: Arithmetic Process between Input Data

The W/L unit segment S(Wi, F7) performs the function F7, in which the arithmetic operation is performed for the input data of the specific word Wi with one or more input data of another word or words Wn. The result of the arithmetic operation is stored in the predetermined portion in the self-holding table AT, the common table CT, the master file MF, the data file DF or so forth. The W/L unit segment will not be established when the corresponding word does not require the arithmetic operation with the input data of the other words.

F8: Arithmetic Operation between Input Data and Internal Data

The W/L unit segment S(Wi, F8) performs a predetermined arithmetic operation for the input data of the specific word with the internal data (data stored in the self-holding table AT, the common table CT, the master file MF, the data file DF or so forth). The result of the arithmetic operation is then stored in the predetermined portion of the self-holding table AT, the common table CT, the master file MF, the data file DF or so forth. The W/L unit segment will not be established when the corresponding word does not require the arithmetic operation for the input data thereof with the internal data.

F9: Arithmetic Operation between Internal Data

The W/L unit segment S(Wi, F9) performs a predetermined arithmetic operation for the internal data of the specific word with the internal data of the other word or words. The result of the arithmetic operation is stored in a predetermined portion of the self-holding table AT, the common table CT, the master file MF, the data file DF or so forth. The W/L unit segment for the function F9 will not be established when the corresponding word does not require the arithmetic operation with respect to the internal data thereof.

In addition to the foregoing W/L unit segments for the nine functions, additional W/L unit segments are established for the following functions.

F10: Initialization Process

W/L unit segments are established for setting the corresponding input data area (prompting items on the data input screen on the display) at a predetermined initial value. This W/L unit segment is established only for the words which requires initial setting of an initial value.

F11: Error Flag Resetting Process

The W/L unit segment is established for resetting the error flag which is set in the W/L unit segments associated with the functions F1, F2, F3 and F4. The W/L unit segments for this function F11 are established only for the necessary words and not established for the words which do not require the error flag resetting process.

F12: Blink Setting Process

The W/L unit segment for this function F12 is established for blinking a data display area of the corresponding word for alerting the operator for erroneous input for the corresponding word. Similarly to the foregoing, this W/L unit segment is established only for the relevant word and not established for the word which does not require error indication.

F13: Blink Releasing Process

The W/L unit segment for this function F13 releases blinking of the data display area which is set for blinking by the W/L unit segment for the function F12. Similarly to the foregoing, this W/L unit segment is established only for the relevant word and not established for the word which does not require error indication.

As can be appreciated herefrom, the W/L unit segment is established for respective ones of the individual function relative to respective ones of the words in a form independent of other W/L unit segments. It should be noted that if judgement whether the W/L unit segment for the corresponding word is necessary or not, is difficult or should take a long period for study, it may be more efficient to establish the W/L unit segments for all of the words and all of the functions in a routine manner.

As a practical example, practically established W/L unit segments are shown in the forms of program lists on pages 49 to 59 of the appendix. It should be noted that the programs shown in the appendix are written employing COBOL as the program language.

Next, the manager program will be explained.

As set forth above, the manager program governs activities or behaviors of the W/L unit segments established for respective words and for respective functions. The manager program thus systematically couples a plurality of W/L unit segments for achieving the processes required in the demanded specification, to establish a source program.

The manager program is generated in separate manner with respect to each of the process units employing a transaction or job or so forth. In the shown embodiment, the process of the system is separated into the sales data collecting process and the ledger generation process. The manager programs are created with respect to respective processes in a separate manner.

FIGS. 5 to 7 show the manager program for realizing the sales data collecting process, in which the functions, a) to display a sales data input screen image on the display 18 to receive data input;

b) to verify the input data;

c) if the result of verification is OK, the input data is written in a sales file established in the database 12;

are performed. Detailed discussion for the shown manager program will be given herebelow with reference to FIGS. 5 to 7.

After initiating execution of the manager program for the sales data collecting process, the initial values are set for respective items on the sales data input screen in a process at a step 100. This process is achieved by performing respective ones of W/L unit segments S(Wi, F10) for the foregoing function F10. Then, the initialized sales data input screen is transmitted to a terminal or is displayed on the display screen for prompting the operator to enter the sales data, at a step 101. The data entered through the terminal or the input device is received at a step 102 to perform the following data processing.

At first, at a step 103, the attribute verification is performed with respect to respective input data for respective words Wi. As can be appreciated, this process can be achieved by performing W/L unit segments S(Wi, F1) for respective ones of the corresponding words. When the error is present in any one of the input data, the error flag E(Wi, F1) for the corresponding word Wi is set during the process of the corresponding W/L unit segment.

If no error is detected through the process of the data attribute verification at the step 103, and thus the result of a test at a step 104 is negative, the process jumps to a step 109 to proceed with the digit number verification. This can be achieved by performing the W/L unit segments S(Wi, F2) for the function F2. If an error in the digit number of the input data is present, the error flag E(Wi, F2) is set for the corresponding word.

When the digit number verification is successfully terminated without detecting any error, the process jumps from the step 109 to a step 115 to perform a presence acceptability verification process via a step 110 for error test. This process is achieved by performing the W/L unit segments S(Wi, F3) for the function F3. When an error is found in the presence acceptability verification, the error flag E(Wi, F3) is set for the corresponding word.

If no error is detected, the process is advanced to a step 121 via a test step 116 for performing verification of the logical relationship between data. As set forth, this is achieved by performing the W/L unit segments S(Wi, F4). Similarly to the foregoing, the error flag E(Wi, F4) will be set when the input error in the logical relationship with other data is found, and the error flag E(Wi, F4) is set for the corresponding word.

When no error is found at the step 121, the process jumps to a step 127 via a test step 122 to perform editing of the sales record and store in the self-holding table AT, the common table CT, the master file MF, the data file DF or so forth. This process is achieved by performing respective ones of the W/L unit segments S(Wi, F5), S(Wi, F6), S(Wi, F7), S(Wi, F8)and S(Wi, F9). Then, the sales data collection process is terminated.

On the other hand, when the error is detected during the data attribute verification process at the step 103, the process is advanced through the test step 104 to a step 105. At the step 105, the blinking release process is performed by the W/L unit segments S(Wi, F13) for initially resetting all blinking. Then, at a step 106, the blinking process of the function F12 is performed by the W/L unit segment S(Wi, F12) for the corresponding word, for which the error flag E(Wi, F1) is set for blinking the corresponding data display area on the sales data input screen. Subsequently, at a step 107, the error flag resetting process of the function F11 is performed by the W/L unit segment S(Wi, F11). Thereafter, at a step 108, the sales data input screen with an error message is re-transmitted or displayed on the display. Thereafter, the process returns to the step 102 for accepting corrected input. With respect to the input data thus re-entered, a similar process to the foregoing is performed.

It should be appreciated that the processes in the steps of 111~114, 117~120 and 123~126 for error indication are substantially the same as those of the steps 105~108.

For facilitating better understanding, the practical program list of the manager program achieving the foregoing processes is illustrated on pages 48 to 51 of the appendix.

Next, another example of application of the present invention will be explained. The shown second embodiment is directed to an application of the architecture of the present invention for a specific business processing of a demanded specification.

In the shown embodiment, it is assumed that the demanded specification is "to read a monthly change detail file, to prepare a journalizing item table with respect to elimination (variation reason="10") and addition (variation reason="41") and with reference to a property management information file, and to write data of a non-zero journalizing base amount (credit, debit) in a monthly change detail file of the corresponding month after editing (this process will be referred to as a "change detail editing process")".

In the demanded specification, the following 23 items of data, 11 items of data in the internal table and another 4 items of data are included in the change detail record.

W1: Change Detail Record (Output)
W2: Change Detail Key Item
W3: Organization Code
W4: Title of Account
W5: Item Code
W6: Concrete Name
W7: Evidence Number
W8: Reference Number
W9: Obtained Date
W10: City Code
W11: Use Portion
W12: Duration
W13: Variation Reason
W14: Elimination or Addition
W15: Number
W16: Obtaining Price
W17: Project
W18: Project Code
W19: Distribution Rate of Project
W20: Date of Close Accounts
W21: Input Number
W22: Row Number
W23: Remarks
W24: Journalizing Item Table
W25: Credit Journalizing Item
W26: Credit Accounting Title Code
W27: Auxiliary Credit Accounting Title Code
W28: Presence or Absence of Credit Distribution
W29: Credit Journalizing Base Amount
W30: Debit journalizing Item
W31: Debit Accounting Title Code
W32: Auxiliary Debit Accounting Title Code
W33: Presence or Absence of Debit Distribution
W34: Debit Journalizing Base Amount
W35: Property Management Information Record
W36: Property Management Information Key Item
W37: Change Detail Record (Input)
W38: Work Area Similarly to the foregoing embodiment, the above-listed 38 items constitute words Wi (i=1~38) to be assigned for respective ones of the W/L unit segments. The 38 words Wi are coupled with the following functions for establishing respective ones of the W/L unit segments. Similarly to the foregoing embodiment, respective ones of the W/L unit segments are independent of others and perform respective ones of the following 9 functions.

F1: Master Information Matching Check

W/L unit segments S(Wi, F1) is established for checking whether the data of the specific word Wi is present in a designated master file. As can be appreciated, the W/L unit segment S(Wi, F1) is established for a respective word Wi coupled with the function F1.

For example, such valid data as the key items for respective words are recorded in a master in exhaustive fashion. In this case, the W/L unit segment S(Wi, F1) is established to make a search of the master for finding the data of the key item in terms of the input data. When the key item matching with that of the input data is present in the master, the input data is judged as valid data, and otherwise as invalid. This W/L unit segment is established with respect to each word. However, as in the former embodiment, no W/L unit segment may be established for a word which does not require a master information matching check.

The W/L unit segment S(Wi, F1) receives the corresponding input data. Simultaneously, the master is read out for performing a search for the input data thereagainst. When the input data is not present on the master and thus judged as invalid, an error flag E(Wi, F1) is set.

F2: Constant Value Matching Check

W/L unit segments S(Wi, F2) are established for checking whether a word satisfies a predetermined condition in comparison with a predetermined constant value.

For example, when the word is of such a nature that the credit journalizing basic amount is zero, the W/L unit segment S(W29, F2) of the word W29 compares the data of the credit journalizing basic amount and zero for checking. Similarly, the W/L unit segments S(Wi, F2) are established for respective words. It should be noted that the W/L unit segment may not be established for a word which does not require a constant value matching check.

The W/L unit segment S(Wi, F2) receives the input data of the specific word Wi. Then, the input data is compared with the predetermined constant value. If the result of comparison shows satisfaction of the predetermined condition, judgement is made that the input data is valid, and otherwise that the input data is invalid. When the input data is valid, an enabling flag E(Wi, F2) is set.

F3: Input Data Recording Process

W/L unit segments S(Wi, F3) are established for storing the input data of the corresponding word to a predetermined portion or portions of the self-holding table AT, the common table CT, the master file MF, and the data file DF. This W/L unit segment S(Wi, F3) is established with respect to the function F3 for respective words Wi. However, the W/L unit segment S(Wi, F3) will not be established for a word which does not require recording of the input data.

F4: Internal Data Transferring Process

W/L unit segments S(Wi, F4) are established for transferring the internal data (data stored in the self-holding table AT, the common table CT, the master file MF, the data file DF or so forth) to another designated portion of the self-holding table AT, the common table CT, the master file MF, the data file DF or so forth, by way of copying or moving. The W/L unit segment S(Wi, F4) is established for respective words except for the word or words which do(es) not require transferring of the internal data.

F5: Internal Data Storing Process

W/L unit segments S(Wi, F5) are established for storing the internal data of the word Wi in the self-holding table AT, the common table CT, the master file MF, the data file DF or so forth. This process is established for each of the 11 internal data except for the word which does not require storing the internal data.

In addition to the foregoing functions F1~F5 as set forth above, W/L unit segments for any auxiliary function are established.

F6: Initialization Process

W/L unit segments S(Wi, F6) are established for setting predetermined initial values for respective ones of the words. This W/L unit segment S(Wi, F6) is established for all of the words except for those which do not require setting of the initial value.

Practical examples of the W/L unit segments in this embodiment are illustrated on pages 63 to 80 in the appendix. Similarly, the shown program list is written by employing COBOL as the program language.

Figure 8:
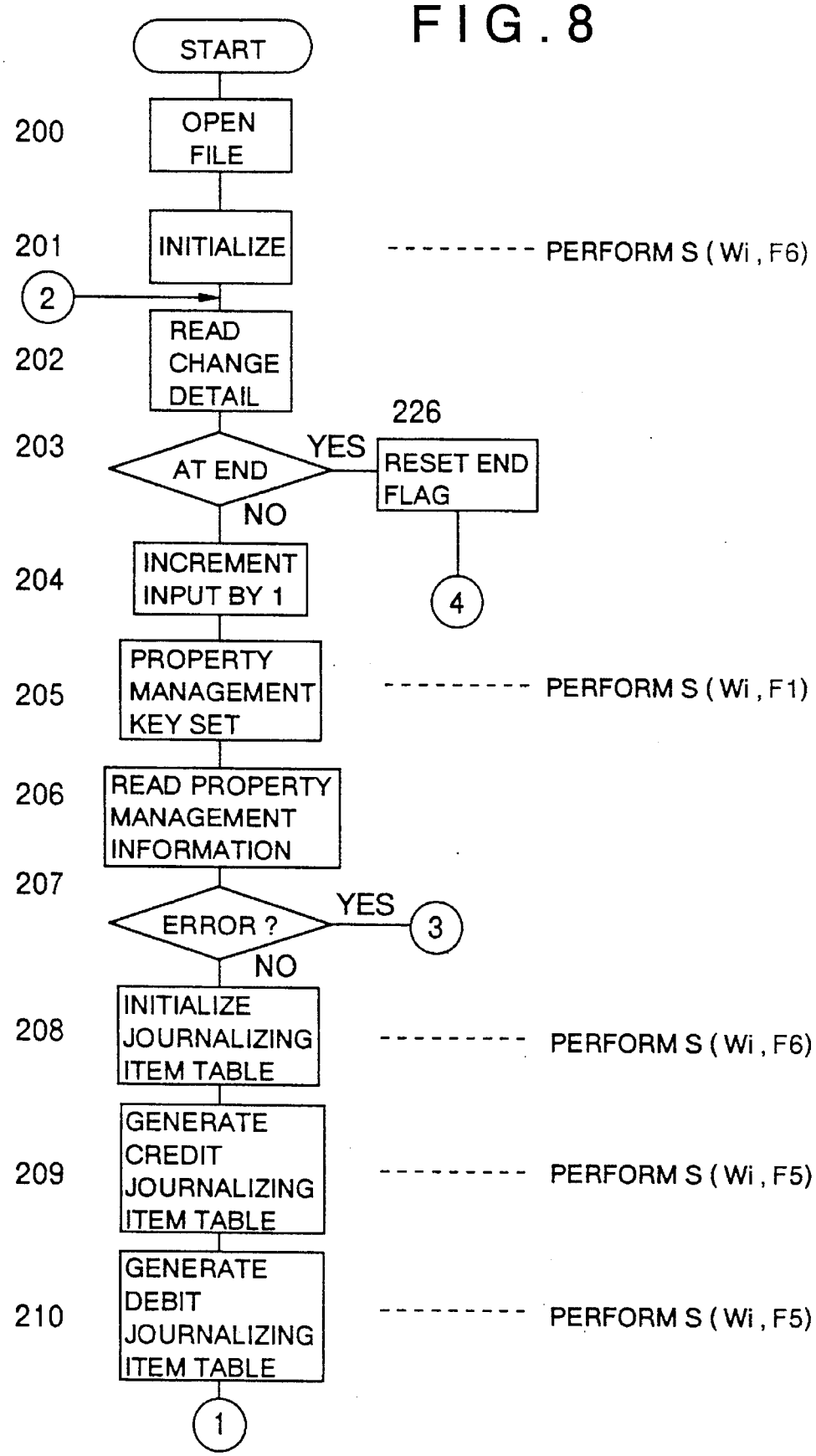
FIGS. 8 to 10 show a sequence of flowchart showing another example of the manager program for a dedicated accounting and financing management system.
Figure 9:
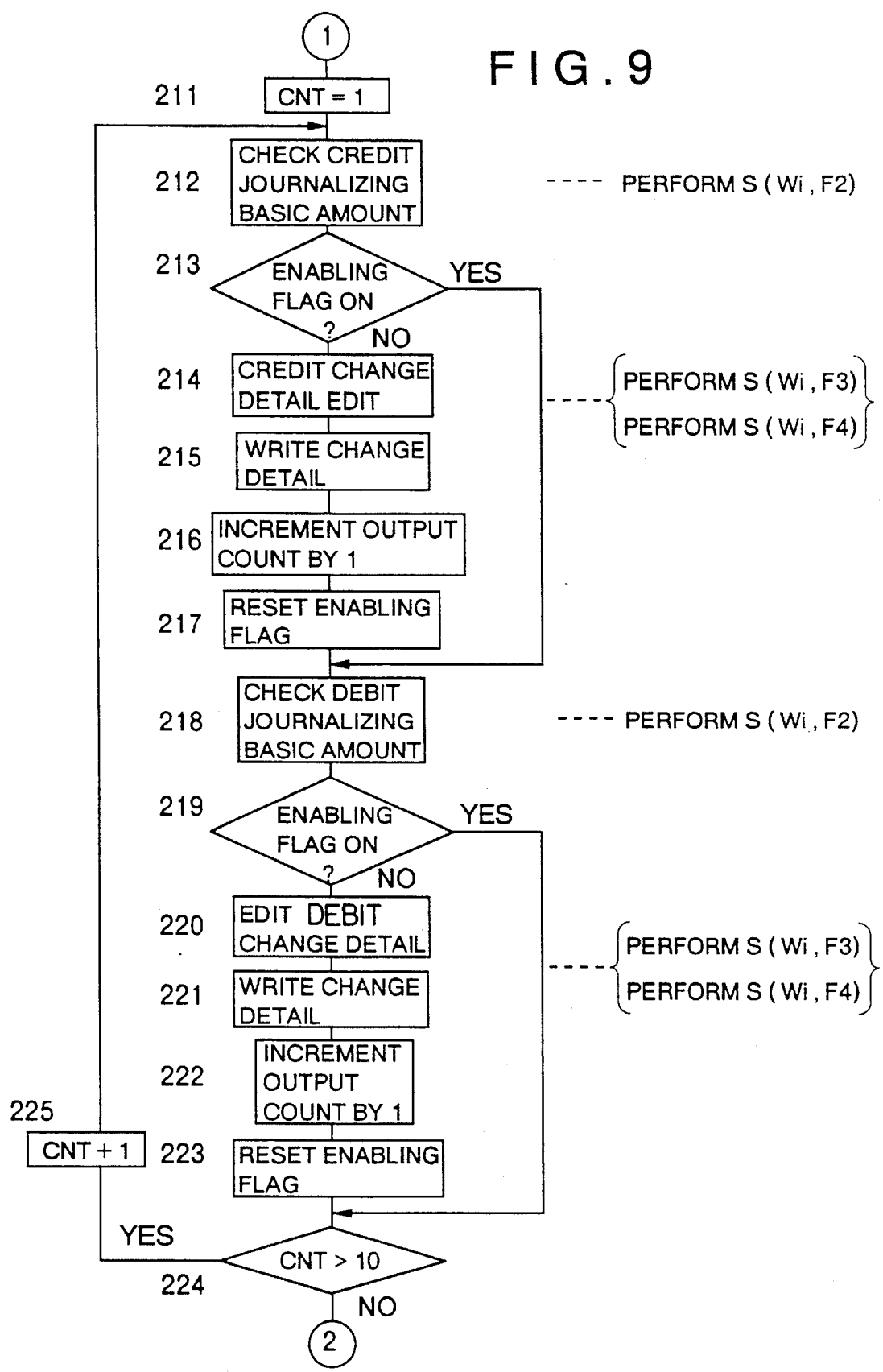
Figure 10:
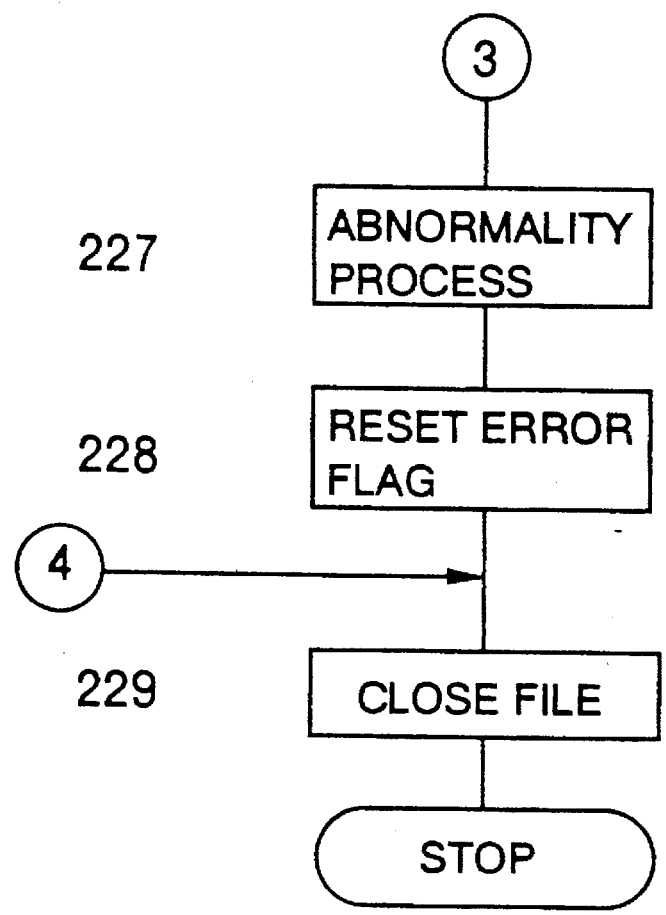

Similarly to the former embodiment, the manager program is established for governing and systematically coupling respective ones of the W/L unit segments. The manager program is created substantially in the same manner as that of the former embodiment. The manager program for governing the behavior of the above-mentioned W/L unit segments will be discussed herebelow with reference to FIGS. 8 to 10. The example of FIGS. 8 to 10 is directed to a process for accomplishing the specification "to read a monthly change detail file, to prepare a journalizing item table with respect to elimination (variation reason="10") and addition (variation reason="41") and with reference to a property management information file, and to write data of a journalizing base amount (credit, debit) in a monthly change detail file of the corresponding month after editing (this process will be referred to as a "change detail editing process")".

Operation of the manager program in the shown embodiment will be discussed herebelow with reference to FIGS. 8 to 10.

In the shown process, at a step 200, a file open process is performed. Then, at a step 201, initial values are set for respective items. This process is done by the W/L unit segments S(Wi, F6).

Subsequently, at a step 202, a READ process for the input file (change detail file) is performed. At a step 203, judgement of the end of data is performed. If the end of data is judged to have occurred, the process jumps to a step 229.

At a step 205, a key setting process is performed based on the input change detail data. A master information matching check is performed. This process is achieved by performing the W/L unit segment S(Wi, F1). If an error is found during this process, the error flag E(Wi, F1) is set.

If the error is detected during the process with the W/L unit segments S(Wi, F1), the process is advanced to a step 227. Otherwise, the process proceeds through steps 208–210. In the steps 209 and 210, the internal data storing process is performed by the W/L unit segments S(Wi, F5).

Next, the constant value matching check is performed at a step 212 which is reached through a step 211 for setting a counter value CNT at one. The process is performed by the W/L unit segments S(Wi, F2). If no error is found in this process, the enabling flag E(Wi, F2) is set.

When no error is found at the step 212, the process is advanced to a step 218 and otherwise, the process proceeds to perform steps 214 to 217. In the steps 214 and 215, the change detail record for the current date is recorded in the data file DF after editing. This process is done by the W/L unit segments S(Wi, F3) and S(Wi, F4). A similar process is performed in the steps 218 to 223. The process through the steps 212 to 223 is repeated until the counter value CNT reaches the predetermined value (10) as detected at a step 224. When the counter value CNT reaches the predetermined value, the process is returned to the step 202.

Next, at the step 129, a CLOSE process for the file is performed to terminate the change detail editing process.

As can be appreciated herefrom, since the computer system according to the present invention employs a novel and unique architecture, in which all necessary individual processes are separated into the simplest possible unit processes which are coupled with each of the associated words to establish the W/L unit segments, and respective W/L unit segments are per se independent and unrelated to other W/L unit segments so that they can be executed irrespective of other segments, and systematically coupled by the manager program for establishing a desired process sequence, each of the W/L unit segments is quite simple to be easily understood and modified, and the manager program is also simple enough to easily understand and modify. Therefore, the computer system according to the present invention facilitates system development with high adaptability for later modification and with remarkably high efficiency and productivity.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within a scope encompassed in the appended claims and equivalents thereof.

APPENDIX

```
*
*
*---------------------------- FILE OPEN
*  INPUT SCREEN, SALES FILE
*
            OPEN       INPUT SCREEN
                 OUTPUT  SALES FILE
*
*
*---------------------------- INITIALIZE AREA
*  INITIALIZE WORK AREA ASL
*  INITIALIZE OUTPUT AREA ASL
*  INITIALIZE SCREEN AREA ASL
*
            PERFORM    S4F011.
            PERFORM    S4F012.
            PERFORM    S4F001.
            PERFORM    S4F002.
            PERFORM    S4F003.
            PERFORM    S4F004.
            PERFORM    S4F005.
            PERFORM    S4F006.
            PERFORM    S4F007.
            PERFORM    S4F008.
            PERFORM    S4F009.
            PERFORM    S4F010.
*
*
*---------------------------- TRANSMIT SCREEN
*
            SEND SALES DATA INPUT SCREEN
*
*
*---------------------------- BLINK SET
*  SET BLINKING OF SCREEN ASL
*
            PERFORM    S4H001.
            PERFORM    S4H002.
            PERFORM    S4H003.
            PERFORM    S4H004.
            PERFORM    S4H005.
            PERFORM    S4H008.
            PERFORM    S4H009.
*
*
*---------------------------- RECEIVE SCREEN
*
     RECEIVE- EDITION.
            RECEIVE  SALES DATA INPUT SCREEN AFTER DATA INPUT
*
*
*---------------------------- END JUDGEMENT
*
            IF END-FLG  =          '1'
```

```
            MOVE ZERO TO END-FLG
            GO   TO END SECTION
            END-IF.
*
*
*----------------------------- ATTRIBUTE VERIFICATION
* INPUT ITEM DATA ATTRIBUTE VERIFICATION ASL
*
            PERFORM    S4A001.
            PERFORM    S4A002.
            PERFORM    S4A003.
            PERFORM    S4A004.
            PERFORM    S4A005.
            PERFORM    S4A008.
            PERFORM    S4A009.
*
*
*----------------------------- BLINK SET
* ERROR PROCESSING OF INPUT ITEM ATTRIBUTE VERIFICATION  ASL
*
            PERFORM    S4G001.
            PERFORM    S4G002.
            PERFORM    S4G003.
            PERFORM    S4G004.
            PERFORM    S4G005.
            PERFORM    S4G008.
            PERFORM    S4G009.
*
*
*----------------------------- ABNORMAL ATTRIBUTE PRESENCE
*                              JUDGEMENT
* ABNORMAL ATTRIBUTE PRESENCE JUDGEMENT  ASL
*
            PERFORM    S3D013.
            IF    ABNORMALITY-FLG   =    '1'
            MOVE ZERO TO    ABNORMALITY-FLG
            GO   TO    RECEIVE-SECTION
            END-IF.
*
*
*----------------------------- DIGIT NUMBER VERIFICATION
* INPUT ITEM DIGIT NUMBER VERIFICATION  ASL
*
            PERFORM    S4B001.
            PERFORM    S4B002.
            PERFORM    S4B003.
            PERFORM    S4B004.
            PERFORM    S4B005.
            PERFORM    S4B008.
            PERFORM    S4B009.
*
*
*----------------------------- BLINK SET
* ERROR PROCESSING OF INPUT ITEM DIGIT NUMBER VERIFICATION ASL
*
            PERFORM    S4G001.
```

```
            PERFORM    S4G002.
            PERFORM    S4G003.
            PERFORM    S4G004.
            PERFORM    S4G005.
            PERFORM    S4G008.
            PERFORM    SEG009.
*
*
*--------------------------- ABNORMAL DIGIT NUMBER
*                     PRESENCE JUDGEMENT
* ABNORMAL DIGIT NUMBER PRESENCE JUDGEMENT  ASL
*
            PERFORM    S3J013.
            IF    ABNORMALITY-FLG   =    '1'
            MOVE ZERO TO    ABNORMALITY-FLG
            GO    TO    RECEIVE-SECTION
            END-IF.
*
*
*--------------------------- PRESENCE ALLOWABILITY
*                     VERIFICATION
* PRESENCE ALLOWABILITY VERIFICATION ASL
*
            PERFORM    S4C001.
            PERFORM    S4C002.
            PERFORM    S4C003.
            PERFORM    S4C004.
            PERFORM    S4C005.
            PERFORM    S4C008.
            PERFORM    S4C009.
*
*
*--------------------------- BLINK SET
* ERROR PROCESSING OF INPUT ITEM PRESENCE ALLOWABILITY   ASL
*
            PERFORM    S4G001.
            PERFORM    S4G002.
            PERFORM    S4G003.
            PERFORM    S4G004.
            PERFORM    S4G005.
            PERFORM    S4G008.
            PERFORM    S4G009.
*
*
*--------------------------- ABNORMAL PRESENCE JUDGEMENT
* ABNORMAL PRESENCE JUDGEMENT ASL
*
            PERFORM    S3K013.
            IF    ABNORMALITY -FLG   =    '1'
            MOVE ZERO TO    ABNORMALITY-FLG
            GO    TO    RECEIVE-SECTION
            END-IF.
*
*
*--------------------------- SCREEN EDITION
* SCREEN EDITION ASL
```

```
*  SALES FILE OUTPUT ASL
*
              PERFORM    S4E001.
              PERFORM    S4E002.
              PERFORM    S4E003.
              PERFORM    S4E004.
              PERFORM    S4E005.
              PERFORM    S4E006.
              PERFORM    S4E007.
              PERFORM    S4E008.
              PERFORM    S4E009.
              PERFORM    S4E010.
*
              PERFORM    S5I014.
              GO   TO    RECEIVE SECTION.
*
*
*-------------------------- END PROCESS
*  END PROCESS
       END PROCESS
              CLOSE INPUT  SCREEN
                             SALES FILE.
*
              STOP RUN.
```

```
*
* INPUT-SALES DATE ATTRIBUTE VERIFICATION
 S1A001      SECTION.
 S1A001-010.
             IF INPUT-SALES DATE-ATTRIBUTE  = ERROR
             MOVE '1'    TO    INPUT-SALES DATE CODE-FLG
             END-IF.
 S1A001-EXIT.
             EXIT.
*
*INPUT-GOODS CODE ATTRIBUTE VERIFICATION
 S1A002      SECTION.
 S1A002-010.
             IF INPUT-GOODS CODE- ATTRIBUTE  =  ERROR
             MOVE '1'    TO    INPUT-GOODS CODE-FLG
             END-IF.
 S1A002-EXIT.
             EXIT.
*
*INPUT-GOODS NAME ATTRIBUTE VERIFICATION
 S1A003      SECTION.
 S1A003-010.
             IF INPUT-GOODS NAME-ATTRIBUTE  =  ERROR
             MOVE '1'    TO    INPUT-GOODS NAME-FLG
             END-IF.
 S1A003-EXIT.
             EXIT.
*
*INPUT-UNIT PRICE ATTRIBUTE VERIFICATION
 S1A004      SECTION.
 S1A004-010.
             IF INPUT-UNIT PRICE-ATTRIBUTE  =  ERROR
             MOVE '1'    TO    INPUT-UNIT PRICE-FLG
             END-IF.
 S1A004-EXIT.
             EXIT.
*
*INPUT-AMOUNT ATTRIBUTE VERIFICATION
 S1A005      SECTION.
 S1A005-010.
             IF INPUT-AMOUNT ATTRIBUTE  =  ERROR
             MOVE '1'    TO    INPUT-AMOUNT-FLG
             END-IF.
 S1A005-EXIT.
             EXIT.
*
*INPUT-SHOP CODE ATTRIBUTE VERIFICATION
 S1A008      SECTION.
 S1A008-010.
             IF INPUT-SHOP CODE  =  ERROR
             MOVE '1'    TO    INPUT-SHOP CODE-FLG
             END-IF.
 S1A008-EXIT.
             EXIT.
*
*INPUT-SHOP NAME ATTRIBUTE VERIFICATION
```

```
S1A009      SECTION.
S1A009-010.
            IF INPUT-SHOP NAME-ATTRIBUTE = ERROR
            MOVE '1'   TO    INPUT-SHOP NAME-FLG
            END-IF.
S1A009-EXIT.
            EXIT.
*
*INPUT-SALES DATE DIGIT NUMBER VERIFICATION
S1B001      SECTION.
S1B001-010.
            IF INPUT-SALES DATE-DIGIT NUMBER = ERROR
            MOVE '1'   TO    INPUT-SALES DATE-FLG
            END-IF.
S1B001-EXIT.
            EXIT.
*
*INPUT-GOODS CODE DIGIT NUMBER VERIFICATION
S1B002      SECTION.
S1B002-010.
            IF INPUT-GOODS CODE-DIGIT NUMBER = ERROR
            MOVE '1'   TO    INPUT-GOODS CODE-FLG
            END-IF.
S1B002-EXIT.
            EXIT.
*
*INPUT-GOODS NAME DIGIT NUMBER VERIFICATION
S1B003      SECTION.
S1B003-010.
            IF INPUT-GOODS NAME-DIGIT NUMBER = ERROR
            MOVE '1'   TO    INPUT-GOODS NAME-FLG
            END-IF.
S1B003-EXIT.
            EXIT.
*
*INPUT-UNIT PRICE DIGIT NUMBER VERIFICATION
S1B004      SECTION.
S1B004-010.
            IF INPUT-UNIT PRICE-DIGIT NUMBER = ERROR
            MOVE '1'   TO    INPUT-UNIT PRICE-FLG
            END-IF.
S1B004-EXIT.
            EXIT.
*
*INPUT-AMOUNT DIGIT NUMBER VERIFICATION
S1B005      SECTION.
S1B005-010.
            IF INPUT-AMOUNT-DIGIT NUMBER = ERROR
            MOVE '1'   TO    INPUT-AMOUNT-FLG
            END-IF.
S1B005-EXIT.
            EXIT.
*
*INPUT-SHOP CODE DIGIT NUMBER
S1B008      SECTION.
S1B008-010.
```

```
                    IF INPUT-SHOP CODE-DIGIT NUMBER = ERROR
                    MOVE '1'    TO    INPUT-SHOP CODE-FLG
                    END-IF.
S1B008-EXIT.
                    EXIT.
*
*INPUT-SHOP NAME-DIGIT NUMBER VERIFICATION
S1B009          SECTION.
S1B009-010.
                    IF INPUT-SHOP NAME-DIGIT NUMBER = ERROR
                    MOVE '1'    TO    INPUT-SHOP NAME -FLG
                    END-IF.
S1B009-EXIT.
                    EXIT.
*
*INPUT-SALES DATE PRESENCE ALLOWABILITY VERIFICATION
S2C001          SECTION.
S2C001-010.
                    IF    INPUT-SALES DATE    =    SPACE
                    MOVE '1'    TO    INPUT-SALES DATE-FLG
                    END-IF.
S2C001-EXIT.
                    EXIT.
*
*INPUT-GOODS CODE PRESENCE ALLOWABILITY VERIFICATION
S2C002          SECTION.
S2C002-010.
                    IF    INPUT-GOODS CODE    =    SPACE
                    MOVE '1'    TO    INPUT-GOODS CODE-FLG
S2C002-EXIT.
                    EXIT.
*
*INPUT-GOODS NAME PRESENCE ALLOWABILITY VERIFICATION
S2C003          SECTION.
S2C003-010.
                    IF    INPUT-GOODS NAME    =    SPACE
                    MOVE '1'    TO    INPUT-GOODS NAME-FLG
                    END-IF.
S2C003-EXIT.
                    EXIT.
*
*INPUT-UNIT PRICE PRESENCE ALLOWABILITY VERIFICATION
S2C004          SECTION.
S2C004-010.
                    IF    INPUT-UNIT PRICE    =    SPACE
                    MOVE '1'    TO    INPUT-UNIT PRICE-FLG
                    END-IF.
S2C004-EXIT.
                    EXIT.
*
*INPUT-AMOUNT PRESENCE ALLOWABILITY VERIFICATION
S2C005          SECTION.
S2C005-010.
                    IF    INPUT-AMOUNT    =    SPACE
                    MOVE '1'    TO    INPUT-AMOUNT-FLG
                    END-IF.
```

```
S2C005-EXIT.
          EXIT.
*
*INPUT-SHOP CODE PRESENCE ALLOWABILITY VERIFICATION
S2C008     SECTION.
S2C008-010.
          IF    INPUT-SHOP CODE   =   SPACE
          MOVE '1'   TO   INPUT-SHOP CODE-FLG
          END-IF.
S2C008-EXIT.
          EXIT.
*
*INPUT SHOP NAME PRESENCE ALLOWABILITY VERIFICATION
S2C009     SECTION.
S2C009-010.
          IF    INPUT-SHOP NAME   =   SPACE
          MOVE '1'   TO   INPUT-SHOP NAME-FLG
          END-IF.
S2C009-EXIT.
          EXIT.
*
*ABNORMAL ATTRIBUTE PRESENCE JUDGEMENT
S3D013     SECTION.
S3D013-010.
          IF    INPUT-SALES DATE-ATTRIBUTE      = ERROR OR
                INPUT GOODS CODE-ATTRIBUTE      = ERROR OR
                INPUT-GOODS NAME-ATTRIBUTE      = ERROR OR
                INPUT-UNIT CODE-ATTRIBUTE       = ERROR OR
                INPUT-AMOUNT-ATTRIBUTE          = ERROR OR
                INPUT-SUM OF SALES-ATTRIBUTE    = ERROR OR
                INPUT-GROUND TOTAL SALES-ATTRIBUTE = ERROR OR
                INPUT-SHOP CODE-ATTRIBUTE       = ERROR OR
                INPUT-SHOP NAME-ATTRIBUTE       = ERROR OR
                INPUT-NUMBER OF SALES-ATTRIBUTE = ERROR OR

MOVE '1'   TO   ABNORMALITY-FLG
          END-IF.
S3D013-EXIT.
          EXIT.
*
*ABNORMAL DIGIT NUMBER PRESENCE JUDGEMENT
S3J013     SECTION.
S3J013-010.
          IF    INPUT-SALES DATE-DIGIT NUMBER   = ERROR OR
                INPUT GOODS CODE-DIGIT NUMBER   = ERROR OR
                INPUT-GOODS NAME-DIGIT NUMBER   = ERROR OR
                INPUT-UNIT CODE-DIGIT NUMBER    = ERROR OR
                INPUT-AMOUNT-DIGIT NUMBER       = ERROR OR
                INPUT-SUM OF SALES-DIGIT NUMBER = ERROR OR
                INPUT-GROUND TOTAL SALES-DIGIT NUMBER = ERROR OR
                INPUT-SHOP CODE-DIGIT NUMBER    = ERROR OR
                INPUT-SHOP NAME-DIGIT NUMBER    = ERROR OR
                INPUT-NUMBER OF SALES-DIGIT NUMBER = ERROR OR

MOVE '1'   TO   ABNORMALITY-FLG
          END-IF.
```

```
S3J013-EXIT.
          EXIT.
*
*ABNORMAL PRESENCE JUDGEMENT
S3K013     SECTION.
S3K013-010.
          IF    INPUT-SALES DATE-PRESENCE      = ERROR OR
                INPUT GOODS CODE-PRESENCE      = ERROR OR
                INPUT-GOODS NAME-PRESENCE      = ERROR OR
                INPUT-UNIT CODE-PRESENCE       = ERROR OR
                INPUT-AMOUNT-PRESENCE          = ERROR OR
                INPUT-SUM OF SALES-PRESENCE    = ERROR OR
                INPUT-GROUND TOTAL SALES-PRESENCE = ERROR OR
                INPUT-SHOP CODE-PRESENCE       = ERROR OR
                INPUT-SHOP NAME-PRESENCE       = ERROR OR
                INPUT-NUMBER OF SALES-PRESENCE = ERROR OR

MOVE '1'    TO     ABNORMALITY-FLG
          END-IF.
3K013-EXIT.
          EXIT.
*
*SALES DATE EDITION
S4E001     SECTION.
S4E001-010.
          IF    OUTPUT-W1-FLG       =      '1'    OR     ZERO
          MOVE  INPUT-SALES DATE    TO     OUTPUT-W1
          MOVE  ZERO                TO     OUTPUT-W1-FLG
          END-IF.
S4E001-EXIT.
          EXIT.
*
*GOODS CODE EDITION
S4E002     SECTION.
S4E002-010.
          IF    OUTPUT-W2-FLG       =      '1'    OR     ZERO
          MOVE  INPUT-GOODS CODE    TO     OUTPUT-W2
          MOVE  ZERO                TO     OUTPUT-W2-FLG
          END-IF.
S4E002-EXIT.
          EXIT.
*
*GOODS NAME EDITION
S4E003     SECTION.
S4E003-010.
          IF    OUTPUT-W3-FLG       =      '1'    OR     ZERO
          MOVE  INPUT-GOODS NAME    TO     OUTPUT-W3
          MOVE  ZERO                TO     OUTPUT-W3-FLG
          END-IF.
S4E003-EXIT.
          EXIT.
*
*UNIT PRICE EDITION
S4E004     SECTION.
S4E004-010.
          IF    OUTPUT -W4-FLG      =      '1'    OR     ZERO
```

```
                MOVE  INPUT-UNIT PRICE    TO     OUTPUT-W4
                MOVE  ZERO                TO     OUTPUT-W4-FLG
                END-IF.
S4E004-EXIT.
                EXIT.
*
*AMOUNT EDITION
S4E005          SECTION.
S4E005-010.
                IF    OUTPUT-W5-FLG       =      '1'    OR     ZERO
                MOVE  INPUT-AMOUNT        TO     OUTPUT-W5
                MOVE  ZERO                TO     OUTPUT-W5-FLG
                END-IF.
S4E005-EXIT.
                EXIT.
*
*SUM OF SALES EDITION
S4L006          SECTION.
S4L006-010.
                IF    OUTPUT-W6-FLG       =      '1'    OR     ZERO
                COMPUTE WK-W6     =  INPUT-UNIT PRICE x INPUT-UNIT PRICE
                MOVE  WK-W6               TO     OUTPUT-W6
                MOVE  ZERO                TO     OUTPUT-W6-FLG
                END-IF.
S4L006-EXIT.
                EXIT.
*
*SALES GROUND TOTAL EDITION
S4E007          SECTION.
S4E007-010.
                IF    OUTPUT-W7-FLG       =      '1'    OR     ZERO
                COMPUTE WK-W7       =      WK-W7        +      WK-W6
                MOVE  WK-W7               TO     OUTPUT-W7
                MOVE  ZERO                TO     OUTPUT-W7-FLG
                END-IF.
S4E007-EXIT.
                EXIT.
*
*SHOP CODE EDITION
S4E008          SECTION.
S4E008-010.
                IF    OUTPUT-W8-FLG       =      '1'    OR     ZERO
                MOVE  INPUT SHOP CODE     TO     OUTPUT-W8
                MOVE  ZERO                TO     OUTPUT-W8-FLG
                END-IF.
S4E008-EXIT.
                EXIT.
*
*SHOP NAME EDITION
S4E009          SECTION.
S4E009-010.
                IF    OUTPUT-W9-FLG       =      '1'    OR     ZERO
                MOVE  INPUT-SHOP NAME     TO     OUTPUT-W9
                MOVE  ZERO                TO     OUTPUT-W9-FLG
                END-IF.
S4E009-EXIT.
```

```
                EXIT.
*
*SALES NUMBER COUNT
S4L010      SECTION.
S4L010-010.
            IF      OUTPUT-W10-FLG    =      '1'    OR    ZERO
            COMPUTE WK-W010=          WK-W10        +     1
            MOVE    WK-W10       TO   OUTPUT-W10
            MOVE    ZERO         TO   OUTPUT-W10-FLG
            END-IF.
S4L0010-EXIT.
            EXIT.
*
*WORK AREA INITIALIZATION
S4F011      SECTION.
S4F011-010.
            IF      WORK AREA-FLG    =      '1'    OR    ZERO
            INITIALIZE       WORK AREA
            MOVE    ZERO         TO   WORK AREA-FLG
            END-IF.
S4F011-EXIT.
            EXIT.
*
*OUTPUT AREA INITIALIZATION
S4F012      SECTION.
S4F012-010.
            IF      OUTPUT AREA-FL    =     '1'    OR    ZERO
            INITIALIZE   OUTPUT AREA
            MOVE ZERO TO              OUTPUT AREA-FLG
            END-IF.
S4F0012-EXIT.
            EXIT.
*
*SCREEN-SALES DATE INITIALIZATION
S4F001      SECTION.
            IF      SCREEN-SALES-FLG    =     '1'    OR    ZERO
            INITIALIZE  SCREEN-SALES DATE
            MOVE ZERO TO              SCREEN-SALES-FLG
            END-IF
S4F001-EXIT.
            EXIT.
*
*SCREEN-GOODS CODE INITIALIZATION
S4F002      SECTION.
S4F002-010.
            IF      SCREEN-GOODS CODE-FLG    =     '1'    OR    ZERO
            INITIALIZE  SCREEN-GOODS CODE
            MOVE ZERO TO              SCREEN-GOOD CODE-FLG
            END-IF.
S4F002-EXIT.
            EXIT.
*
*SCREEN-GOODS NAME INITIALIZATION
S4F003      SECTION.
S4F003-010.
            IF      SCREEN-GOODS NAME-FLG    =     '1'    OR    ZERO
```

```
              INITIALIZE  SCREEN-GOODS NAME
              MOVE ZERO TO          SCREEN GOODS NAME-FLG
              END-IF.
S4F003-EXIT.
              EXIT.
     *
*SCREEN-UNIT PRICE INITIALIZATION
S4F004        SECTION.
S4F004-010.
              IF    SCREEN-UNIT PRICE-FLG   =    '1'   OR   ZERO
              INITIALIZE  SCREEN-UNIT PRICE
              MOVE ZERO TO          SCREEN-UNIT PRICE-FL
              END-IF.
S4F004-EXIT.
              EXIT.
     *
*SCREEN-AMOUNT INITIALIZATION
S4F005        SECTION.
S4F005-010.
              IF    SCREEN-AMOUNT-FLG       =    '1'   OR   ZERO
              INITIALIZE  SCREEN-AMOUNT
              MOVE ZERO TO          SCREEN-AMOUNT-FLG
              END-IF.
S4F005-EXIT.
              EXIT.
     *
*SCREEN-SALES SUM INITIALIZATION
S4F006        SECTION.
S4F006-010.
              IF    SCREEN-SALES SUM-FLG    =    '1'   OR   ZERO
              INITIALIZE SCREEN-SALES SUM
              MOVE ZERO TO          SCREEN-SALES SUM-FLG
              END-IF.
SF006-EXIT.
              EXIT.
     *
*SCREEN-SALES GROUND TOTAL INITIALIZATION
S4F007        SECTION.
S4F007-010.
              IF    SCREEN-SALES GROUND TOTAL-FLG =    '1'  OR ZERO
              INITIALIZE SCREEN-SALES GROUND TOTAL
              MOVE ZERO TO    SCREEN-SALES GROUND TOTAL-FLG
              END-IF.
S4F007-EXIT.
              EXIT.
     *
*SCREEN-SHOP CODE INITIALIZATION
S4F008        SECTION.
S4F008-010.
              IF    SCREEN-SHOP CODE-FLG    =    '1'   OR   ZERO
              INITIALIZE  SCREEN-SHOP CODE
              MOVE ZERO TO       SCREEN-SHOP CODE-FLG
              END-IF.
S4F008-EXIT.
              EXIT.
     *
```

```
*SCREEN-SHOP NAME INITIALIZATION
S4F009      SECTION.
S4F009-010.
            IF    SCREEN-SHOP NAME-FLG    =    '1'    OR    ZERO
            INITIALIZE  SCREEN-SHOP NAME
            MOVE  ZERO  TO          SCREEN-SHOP NAME-FLG
            END-IF.
S4F009-EXIT.
            EXIT.
*
* SCREEN-SALES NUMBER INITIALIZATION
S4F010      SECTION.
S4F010-010.
            IF    SCREEN-SALES NUMBER-FLG    =    '1'    OR    ZERO
            INITIALIZE  SCREEN-SALES NUMBER
            MOVE  ZERO  TO          SCREEN-SALES NUMBER-FLG
            END-IF.
S4F009-EXIT.
            EXIT.
*
*SCREEN-SALES DATE BLINK SET
S4G001      SECTION.
S4G001-010.
            IF    SCREEN-SALES DATE-FLG    =    '1'
            MOVE  BLINK SET    TO    SCREEN-SALES DATE
            MOVE  ZERO         TO    SCREEN-SALES DATE-FLG
            END-IF.
S4G001-EXIT.
            EXIT.
*
*SCREEN-GOODS CODE BLINK SET
S4G002      SECTION.
S4G002-010.
            IF    SCREEN-GOODS CODE-FLG    =    '1'
            MOVE  BLINK SET    TO    SCREEN-GOODS CODE
            MOVE  ZERO         TO    SCREEN-GOODS CODE-FLG
            END-IF.
S4G002-EXIT.
            EXIT.
*
*SCREEN-GOODS NAME BLINK SET
S4G003      SECTION.
S4G003-010.
            IF    SCREEN-GOODS NAME-FLG    =    '1'
            MOVE  BLINK SET    TO    SCREEN-GOODS NAME
            MOVE  ZERO         TO    SCREEN-GOODS NAME-FLG
            END-IF.
S4G003-EXIT.
            EXIT.
*
*SCREEN-UNIT PRICE BLINK SET
S4G004      SECTION.
S4G004-010.
            IF    SCREEN-UNIT PRICE-FLG    =    '1'
            MOVE  BLINK SET    TO    SCREEN-UNIT PRICE
            MOVE  ZERO         TO    SCREEN-UNIT PRICE-FLG
```

```
                    END-IF.
S4G004-EXIT.
                    EXIT.
*
*SCREEN-AMOUNT BLINK SET
S4G005         SECTION.
S4G005-010.
                    IF      SCREEN-AMOUNT-FLG      =      '1'
                    MOVE BLINK SET    TO      SCREEN-AMOUNT
                    MOVE ZERO         TO      SCREEN-AMOUNT-FLG
                    END-IF.
S4G005-EXIT.
                    EXIT.
*
*SCREEN-SHOP CODE SET
S4G008         SECTION.
S4G008-010.
                    IF      SCREEN-SHOP CODE-FLG   =      '1'
                    MOVE BLINK SET    TO      SCREEN-SHOP CODE
                    MOVE ZERO         TO      SCREEN-SHOP CODE-FLG
                    END-IF.
S4G008-EXIT.
                    EXIT.
*
*SCREEN-SHOP NAME
S4G009         SECTION.
S4G009-010.
                    IF      SCREEN-SHOP NAME       =      '1'
                    MOVE BLINK SET    TO      SCREEN-SHOP NAME
                    MOVE ZERO         TO      SCREEN-SHOP NAME-FLG
                    END-IF.
S4G009-EXIT.
                    EXIT.
*
*SCREEN-SALES DATE BLINK RESET
S4H001         SECTION.
S4H001-010.
                    IF      SCREEN-SALES DATE-FLG  =      '1'
                    MOVE BLINK RESET  TO      SCREEN-SALES DATE
                    MOVE ZERO         TO      SCREEN-SALES DATE-FLG
                    END-IF.
S4H001-EXIT.
                    EXIT.
*
*SCREEN-GOODS CODE BLINK RESET
S4H002         SECTION.
S4H002-010.
                    IF      SCREEN-GOODS CODE-FLG  =      '1'
                    MOVE BLINK RESET  TO      SCREEN-GOODS CODE
                    MOVE ZERO         TO      SCREEN-GOODS CODE-FLG
                    END-IF.
S4H002-EXIT.
                    EXIT.
*
*SCREEN-GOODS NAME BLINK RESET
S4H003         SECTION.
```

```
S4H003-010.
            IF      SCREEN-GOODS NAME-FLG   =       '1'
            MOVE  BLINK RESET  TO    SCREEN-GOODS NAME
            MOVE  ZERO         TO    SCREEN-GOODS NAME-FLG
            END-IF.
S4H003-EXIT.
            EXIT.
*
*SCREEN-UNIT PRICE BLINK RESET
S4H004      SECTION.
S4H004-010.
            IF      SCREEN-UNIT PRICE-FLG   =       '1'
            MOVE  BLINK RESET  TO    SCREEN-UNIT PRICE
            MOVE  ZERO         TO    SCREEN-UNIT PRICE-FLG
            END-IF.
S4H004-EXIT.
            EXIT.
*
*SCREEN-AMOUNT BLINK RESET
S4H005      SECTION.
S4H005-010.
            IF      SCREEN-AMOUNT-FLG       =       '1'
            MOVE  BLINK RESET  TO    SCREEN-AMOUNT
            MOVE  ZERO         TO    SCREEN-AMOUNT-FLG
            END-IF.
S4H005-EXIT.
            EXIT.
*
*SCREEN-SHOP CODE BLINK RESET
S4H008      SECTION.
S4H008-010.
            IF      SCREEN-SHOP CODE-FLG    =       '1'
            MOVE  BLINK RESET  TO    SCREEN-SHOP CODE
            MOVE  ZERO         TO    SCREEN-SHOP CODE-FLG
            END-IF.
S4H008-EXIT.
            EXIT.
*
*SCREEN-SHOP NAME BLINK RESET
S4H009      SECTION.
S4H009-010.
            IF      SCREEN-SHOP NAME        =       '1'
            MOVE  BLINK RESET  TO    SCREEN-SHOP NAME
            MOVE  ZERO         TO    SCREEN-SHOP NAME-FLG
            END-IF.
S4H009-EXIT.
            EXIT.
*

*SALES FILE OUTPUT
S5I012      SECTION.
S5I012-010.
            WRITE OUTPUT AREA
S5I012-EXIT.
            EXIT.
```

```
*
*
*----------------------------- FILE OPEN
*
*
                OPEN   INPUT  PROPERTY MANAGEMENT INFORMATION FILE
                                     VARIATION DETAIL (INPUT) FILE
                OPEN   OUTPUT VARIATION DETAIL (OUTPUT) FILE
*
*
*----------------------------- INITIALIZE
*  WORK AREA INITIALIZATION ASL
                PERFORM       S4A038
*
                MOVE  ZERO   TO INPUT COUNT
                MOVE  ZERO   TO OUTPUT COUNT
*
*
MAIN-SYORI-START
*
*
*----------------------------- READ VARIATION DETAIL RECORD
*  VARIATION DETAIL (SEQ) RECORD READ ASL
*
                PERFORM       S05A001
                IF      END-FLG            =         '1'
                MOVE  ZERO   TO     END-FLG
                TO      TO     END-SYORI
                END-IF
                ADD    1      TO   INPUT COUNT
*
*
*----------------------------- READ PROPERTY MANAGEMENT
*                                         RECORD
*  PROPERTY MANAGEMENT RECORD READ KEY SET ASL
*  PROPERTY MANAGEMENT READ ASL
*  PROPERTY MANAGEMENT READ ABNORMALITY PROCESSING ASL
                PERFORM ·     S5A036
*
                PERFORM       S5A035
                IF      ERROR -FLG    =         '1'
                PERFORM       S5B035
                MOVE  ZERO   TO     ERROR -FLG
                GO     TO     END-SYORI
                END-IF
*
*
*----------------------------- INITIALIZE AREA
*  JOURNALIZING ITEM TABLE INITIALIZATION ASL
*
                PERFORM       S4A024
*
*
*----------------------------- EDIT JOURNALIZING ITEM TABLE
*  CREDIT JOURNALIZING ITEM TABLE EDITION ASL
*
```

```
            PERFORM    S4A026
            PERFORM    S4B026
            PERFORM    S4A027
            PERFORM    S4A028
            PERFORM    S4A029
* DEBIT JOURNALIZING ITEM TABLE EDITION ASL
*
            PERFORM    S4A031
            PERFORM    S4B031
            PERFORM    S4A032
            PERFORM    S4B032
            PERFORM    S4A033
            PERFORM    S4B033
            PERFORM    S4A034
            PERFORM    S4AB04
*
*
*--------------------------- EDIT VARIATION DETAIL RECORD
* REPEAT COUNT INITIAL SET
            MOVE  1    TO     CNT
*
*
 KASI-EDIT
*
*
* VARIATION DETAIL RECORD CREDIT DATA EDITION JUDGEMENT ASL
*
            PERFORM    S2B029
            IF     CREDIT BASE AMOUNT-FLG  =     '1'
            MOVE ZERO  TO    CREDIT BASE AMOUNT-FLG
            GO    TO    KARI-EDIT
            END-IF
*
*
* OUTPUT AREA INITIALIZATION ASL
* VARIATION DETAIL RECORD CREDIT DATA EDITION ASL
* VARIATION DETAIL RECORD CREDIT DATA WRITE ASL
*
            PERFORM    S4A001
            PERFORM    S4A003
            PERFORM    S4A004
            PERFORM    S4A005
            PERFORM    S4A006
            PERFORM    S4A007
            PERFORM    S4A008
            PERFORM    S4A009
            PERFORM    S4A010
            PERFORM    S4A011
            PERFORM    S4A012
            PERFORM    S4A013
            PERFORM    S4A014
            PERFORM    S4A015
            PERFORM    S4A016
            PERFORM    S4A017
            PERFORM    S4A018
            PERFORM    S4A019
```

```
            PERFORM     S4A020
            PERFORM     S4A021
            PERFORM     S4A022
            PERFORM     S4A032
*
            PERFORM     S5B001
            ADD    1    TO OUTPUT COUNT
*
*
 KARI-EDIT
*
*
* VARIATION DETAIL RECORD DEBIT DATA EDITION JUDGEMENT ASL
*
            PERFORM S2C034
            IF     DEBIT BASE AMOUNT-FLG   =      '1'
            MOVE ZERO  TO    DEBIT BASE AMOUNT-FLG
            GO     TO     ROOP-HANTEI
            END-IF
*
*
* OUTPUT AREA INITIALIZATION ASL
* VARIATION DETAIL RECORD DEBIT DATA EDITION ASL
* VARIATION DETAIL RECORD DEBIT DATA WRITE ASL
*
            PERFORM     S4B001
            PERFORM     S4B003
            PERFORM     S4B004
            PERFORM     S4B005
            PERFORM     S4B006
            PERFORM     S4B007
            PERFORM     S4B008
            PERFORM     S4B009
            PERFORM     S4B010
            PERFORM     S4B011
            PERFORM     S4B012
            PERFORM     S4B013
            PERFORM     S4B014
            PERFORM     S4B015
            PERFORM     S4B016
            PERFORM     S4B017
            PERFORM     S4B018
            PERFORM     S4B019
            PERFORM     S4B020
            PERFORM     S4B021
            PERFORM     S4B022
            PERFORM     S4B023
*
            PERFORM     S5C001
            ADD    1    TO OUTPUT COUNT
*
*
 ROOP-HANTEI
*
*
* REPEAT JUDGEMENT
```

```
*CNT                = REPEAT COUNT
*TBL-MAX   =        JOURNALIZING ITEM TABLE MAX COUNT VALUE
           IF    CNT   NOT   <    TBL-MAX
           GO    TO    MAIN-SYORI-START
           ELSE
           COMPUT     CNT   =    CNT + 1
           END-IF
*
*
 END-SYORI
*
*
*---------------------------- FILE CLOSE
* PROPERTY MANAGEMENT INFORMATION, VARIATION DETAIL INPUT,
* VARIATION DETAIL OUTPUT
*
                CLOSE PROPERTY MANAGEMENT INFORMATION FILE
                      VARIATION DETAIL (INPUT) FILE
                      VARIATION DETAIL (OUTPUT) FILE
                STOP RUN
```

```
*
*WORK AREA INITIALIZATION
S4A038      SECTION
S4A038-010
            IF    WORK AREA-FLG          =    '1'    OR    ZERO
            INITIALIZE WORK AREA
            MOVE ZERO TO   WORK AREA-FLG
            END-IF
S4A038-EXIT
            EXIT
*
*VARIATION DETAIL RECORD READ
S5A001      SECTION
S5A001-010
            READ VARIATION DETAIL RECORD
            AT    END    MOVE '1'    TO    END-FLG
            END-READ
S5A001-EXIT
            EXIT
*
*PROPERTY MANAGEMENT RECORD READ KEY SET
S4A036      SECTION
S4A036-010
            IF    PROPERTY MANAGEMENT KEY ITEM-FLG = '1' OR    ZERO
            MOVE VARIATION DETAIL-ORGANIZATION CODE
                  TO PROPERTY MANAGEMENT-ORGANIZATION CODE
            MOVE VARIATION DETAIL-ACCOUNTING TILE CODE
                  TO PROPERTY MANAGEMENT-ACCOUNTING TITLE CODE
            MOVE VARIATION DETAIL-ITEM CODE
                  TO PROPERTY MANAGEMENT-ITEM CODE
            MOVE VARIATION DETAIL-CONCRETE NAME CODE
                  TO PROPERTY MANAGEMENT-CONCRETE NAME CODE
            MOVE VARIATION DETAIL-EVIDENCE NUMBER
                  TO PROPERTY MANAGEMENT-EVIDENCE NUMBER
            MOVE VARIATION DETAIL-REFERENCE NUMBER
                  TO PROPERTY MANAGEMENT-REFERENCE NUMBER
            MOVE ZERO
                  TO    PROPERTY MANAGEMENT KEY ITEM-FLG
            END-IF
S4A036-EXIT
            EXIT
*
* PROPERTY MANAGEMENT RECORD READ
S4A035      SECTION
S4A035-010
            READ PROPERTY MANAGEMENT RECORD
            INVALID    MOVE '1'    TO    ERROR -FLG
            END-READ
S5A035-EXIT
            EXIT
*
* PROPERTY MANAGEMENT RECORD READ ERROR PROCESSING
S5B035      SECTION
S5B035-010
            DISPLAY "PROPERTY MANAGEMENT READ ERROR'
            DISPLAY           KEY = PROPERTY MANAGEMENT KEY ITEM
```

```
                    MOVE '1'   TO    PROPERTY MANAGEMENT RECORD-FLG
S5B035-EXIT
            EXIT
*
*JOURNALIZING ITEM TABLE INITIALIZATION
S4A024      SECTION
S4A024-010
            IF    JOURNALIZING ITEM-FLG  =      '1'   OR   ZERO
            INITIALIZE JOURNALIZING ITEM TABLE
            MOVE ZERO  TO    JOURNALIZING ITEM-FLG
            END-IF
S4A024-EXIT
            EXIT
*
*ELIMINATED CREDIT ACCOUNTING TITLE CODE EDITION
   S4A026   SECTION
S4A026-010
            IF ELIMINATED CREDIT ACCOUNTING TITLE-FLG  =  '1' OR  ZERO
            IF ELIMINATION AND ADDITION REASON  =  '10'
            MOVE  VARIATION DETAIL-ACCOUNTING TITLE CODE
                   TO JOURNALIZING CREDIT ACCOUNTING TITLE CODE (1)
            END-IF
            MOVE ZERO TO ELIMINATED CREDIT ACCOUNTING TILE-FLG
            END-IF
S4A026-EXIT
            EXIT
*
*ADDED CREDIT ACCOUNTING TITLE CODE EDITION
S4B026      SECTION
S4B026-010
            IF    ADDED CREDIT ACCOUNTING TITLE-FLG = '1'  OR  ZERO
            IF ELIMINATION AND ADDITION REASON  =  '41'
            MOVE '218'
         TO JOURNALIZING CREDIT ACCOUNTING TILE CODE(1)
            END-IF
            MOVE ZERO TO ADDED CREDIT ACCOUNTING TITLE-FLG
            END-IF
S4B026-EXIT
            EXIT
*
*CREDIT AUXILIARY TILE CODE EDITION
   S4A027   SECTION
S4A027-010
            IF    CREDIT AUXILIARY TITLE-FLG  =  '1'  OR  ZERO
            IF  ELIMINATION AND ADDITION REASON  =  '10'  OR  '41'
            MOVE '000'
                   TO JOURNALIZING CREDIT AUXILIARY TITLE CODE (1)
            END-IF
            MOVE ZERO  TO    CREDIT AUXILIARY TITLE-FLG
            END-IF
S4A027-EXIT
            EXIT
*
*CREDIT PRESENCE AND ABSENCE RECORD EDITION
   S4A028   SECTION
S4A028-010
```

```
            IF     CREDIT PRESENCE AND ABSENCE-FLG = '1' OR ZERO
            IF     ELIMINATION AND ADDITION REASON = '10' OR '41'
            MOVE  '1'
                   TO JOURNALIZING CREDIT PRESENCE AND ABSENCE CODE(1)
            END-IF
            MOVE ZERO TO    CREDIT PRESENCE AND ABSENCE-FLG
            END-IF
S4A028-EXIT
            EXIT
*
*CREDIT BASE AMOUNT EDITION
S4A029      SECTION
S4A029-010
            IF     CREDIT BASE AMOUNT-FLG = '1' OR ZERO
            IF     ELIMINATION AND ADDITION REASON = '10' OR '41'
            MOVE VARIATION DETAIL-INCOMING AMOUNT
                   TO JOURNALIZING CREDIT BASE AMOUNT (1)
            END-IF
            MOVE ZERO TO    CREDIT BASE AMOUNT-FLG
            END-IF
S4A029-EXIT
            EXIT
*
*ELIMINATED DEBIT ACCOUNTING TITLE CODE EDITION
S4A031      SECTION
S4A031-010
            IF     ELIMINATED DEBIT ACCOUNTING TITLE-FLG = '1' OR ZERO
            IF     ELIMINATION AND ADDITION REASON = '10'
            MOVE '850'
                   TO JOURNALIZING ACCOUNTING TITLE CODE (1)
            MOVE '220'
                   TO JOURNALIZING ACCOUNTING TITLE CODE (2)
            MOVE '962'
                   TO JOURNALIZING ACCOUNTING TITLE CODE (3)
            END-IF
            MOVE ZERO TO ELIMINATED DEBIT ACCOUNTING TITLE-FLG
            END-IF
S4A031-EXIT
            EXIT
*
*ADDED DEBIT ACCOUNTING TITLE CODE EDITION
S4B031      SECTION
S4B031-010
            IF     ADDED DEBIT ACCOUNTING TILE-FLG = '1' OR ZERO
            IF     ELIMINATION AND ADDITION REASON = '41'
            MOVE VARIATION DETAIL-ACCOUNTING TITLE CODE
                   TO JOURNALIZING DEBIT ACCOUNTING TITLE CODE (1)
            END-IF
            MOVE ZERO TO    ADDED DEBIT ACCOUNTING TITLE-FLG
            END-IF
S4B031-EXIT
            EXIT
*
*ELIMINATED DEBIT AUXILIARY ACCOUNTING TITLE CODE EDITION
S4A032      SECTION
S4A032-010
```

```
                IF      ELIMINATED DEBIT AUXILIARY TILE-FLG = '1' OR ZERO
                IF      ELIMINATION AND ADDITION REASON = '10'
                MOVE '101'
                        TO JOURNALIZING DEBIT AUXILIARY TITLE CODE (1)
                MOVE '000'
                        TO JOURNALIZING DEBIT AUXILIARY TITLE CODE (2)
                MOVE '000'
                        TO JOURNALIZING DEBIT AUXILIARY TITLE CODE (3)
                END-IF
                MOVE ZERO TO ELIMINATED DEBIT AUXILIARY TITLE-FLG
                END-IF
S4A032-EXIT
                EXIT
*
*ADDED DEBIT AUXILIARY TITLE CODE EDITION
S4B032          SECTION
S4B032-010
                IF      ADDED DEBIT AUXILIARY TITLE-FLG = '1' OR ZERO
                IF      ELIMINATION AND ADDITION REASON = '41'
                MOVE '000'
                        TO JOURNALIZING DEBIT AUXILIARY TITLE CODE (1)
                END-IF
                MOVE ZERO TO    ADDED DEBIT AUXILIARY TITLE-FLG
                END-KF
S4B032-EXIT
                EXIT
*
*ELIMINATED DEBIT PRESENCE AND ABSENCE CODE EDITION
S4A033          SECTION
S4A033-010
                IF ELIMINATED DEBIT PRESENCE AND ABSENCE-FLG = '1' OR ZERO
                IF ELIMINATION AND ADDITION REASON = '10'
                MOVE '1'
                TO JOURNALIZING DEBIT PRESENCE AND ABSENCE CODE (1)
                MOVE '1'
                TO JOURNALIZING DEBIT PRESENCE AND ABSENCE CODE (2)
                MOVE '1'
                TO JOURNALIZING DEBIT PRESENCE AND ABSENCE CODE (3)
                END-IF
                MOVE ZERO TO ELIMINATED DEBIT PRESENCE AND ABSENCE-FLG
                END-IF
S4A033-EXIT
                EXIT
*
*ADDED DEBIT PRESENCE AND ABSENCE CODE EDITION
S4B033          SECTION
S4B033-010
                IF      ADDED DEBIT PRESENCE AND ABSENCE-FLG = '1' OR ZERO
                IF      ELIMINATION AND ADDITION REASON = '41'
                MOVE '1'
                        TO JOURNALIZING DEBIT PRESENCE AND ABSENCE CODE (1)
                END-IF
                MOVE ZERO TO ADDED DEBIT PRESENCE AND ABSENCE-FLG
                END-IF
S4B033-EXIT
                EXIT
```

```
*
*ELIMINATED DEBIT BASE AMOUNT EDITION
 S4A034      SECTION
 S4A034-010
             IF    ELIMINATED DEBIT BASE AMOUNT-FLG  =  '1'  OR  ZERO
             IF    ELIMINATION AND ADDITION REASON  =  '10'
             COMPUTE  JOURNALIZING DEBIT BASE AMOUNT (1)
             =     PROPERTY MANAGEMENT-LAST YEAR REMAINED OWNED AMOUNT
             +     PROPERTY MANAGEMENT-CURRENT YEAR INCREASED INCOME
  AMOUNT
             +     PROPERTY MANAGEMENT-CURRENT YEAR DECREASED INCOME
  AMOUNT
             COMPUTE JOURNALIZING DEBIT BASE AMOUNT (2)
             =     PROPERTY MANAGEMENT-LAST YEAR ACCUMULATED
  DEPRECIATION
             +     PROPERTY MANAGEMENT-CURRENT YEAR INCREASED
                   ACCUMULATED DEPRECIATION
             +     PROPERTY MANAGEMENT-CURRENT YEAR DECREASED
                   ACCUMULATED DEPRECIATION
             COMPUTE JOURNALIZING DEBIT BASE AMOUNT (3)
             =     VARIATION DETAIL-INCOME AMOUNT
             -     {(PROPERTY MANAGEMENT-LAST YEAR OWNED AMOUNT
             +     PROPERTY MANAGEMENT-CURRENT YEAR INCREASED INCOME
             -     PROPERTY MANAGEMENT-CURRENT YEAR DECREASED INCOME)
             +     (PROPERTY MANAGEMENT-LAST YEAR DEPRECIATION ACCUMULATED
  AMOUNT
             +     PROPERTY MANAGEMENT-CURRENT YEAR INCREASED
                   DEPRECIATION ACCUMULATED AMOUNT
             -     PROPERTY MANAGEMENT-CURRENT YEAR DECREASED
                   DEPRECIATION ACCUMULATED AMOUNT
             END-IF
             MOVE ZERO TO ELIMINATED DEBIT BASE AMOUNT-FLG
             ENDIF
 S4A034-EXIT
             EXIT
*
*ADDED DEBIT BASE AMOUNT
 S4B034      SECTION
 S4B034-010
             IF    ADDED DEBIT BASE AMOUNT-FLG    =       '1'    OR    ZERO
             IF    ELIMINATION AND ADDITION REASON  =  '41'
             MOVE  VARIATION DETAIL-INCOME AMOUNT
                   TO JOURNALIZING DEBIT BASE AMOUNT (1)
             END-IF
             MOVE ZERO  TO    ADDED DEBIT BASE AMOUNT-FLG
             END-IF
 S4B034-EXIT
             EXIT
*
*CREDIT DATA EDITION JUDGEMENT
 S2B029      SECTION
 S2B029-010
             IF    JOURNALIZING CREDIT BASE AMOUNT (CNT)    =    ZERO
             MOVE  '1'   TO    CREDIT BASE AMOUNT-FLG
             END-IF
 S2B029-EXIT
```

```
                    EXIT
*
*VARIATION DETAIL CREDIT OUTPUT AREA INITIALIZATION
    S4A001      SECTION
    S4A001-010
                IF      OUTPUT AREA-FLG           =      '1'     OR      ZERO
                INITIALIZE OUTPUT AREA
                MOVE ZERO   TO      OUTPUT AREA-FLG
                END-IF
    S4A001-EXIT
                EXIT
*
*CREDIT ORGANIZATION CODE EDITION
    S4A003      SECTION
    S4A003-010
                IF      ORGANIZATION CODE-FLG       =     '1'     OR      ZERO
                MOVE ORGANIZATION CODE   TO VARIATION DETAIL-ORGANIZATION CODE
                MOVE ZERO   TO      ORGANIZATION CODE-FLG
                END-IF
    S4A003-EXIT
                EXIT
*
*CREDIT ACCOUNTING TITLE CODE EDITION
    S4A004      SECTION
    S4A004-010
                IF      ACCOUNTING TITLE CODE-FLG         =     '1'     OR
    ZERO
                MOVE JOURNALIZING CREDIT ACCOUNTING TITLE CODE (CNT)
                      TO VARIATION DETAIL-ACCOUNTING TITLE CODE
                MOVE ZERO   TO      ACCOUNTING TITLE CODE-FLG
                END-IF
    S4A004-EXIT
                EXIT
*
*CREDIT ITEM CODE EDITION
    S4A005      SECTION
    S4A005-010
                IF      ITEM CODE-FLG             =     '1'     OR      ZERO
                MOVE ITEM CODE     TO VARIATION DETAIL-ITEM CODE
                MOVE ZERO   TO      ITEM CODE-FLG
                END-IF
    S4A005-EXIT
                EXIT
*
*CREDIT CONCRETE NAME CODE EDITION
    S4A006      SECTION
    S4A006-010
                IF      CONCRETE NAME CODE-FLG         =     '1'     OR      ZERO
                MOVE CONCRETE NAME CODE  TO  VARIATION-DETAIL-CONCRETE NAME
    CODE
                MOVE ZERO   TO      CONCRETE NAME CODE-FLG
                END-IF
    S4A006-EXIT
                EXIT
*
*CREDIT EVIDENCE NUMBER EDITION
```

```
S4A007      SECTION
S4A007-010
            IF    EVIDENCE NUMBER-FLG         =    '1'    OR    ZERO
            MOVE  EVIDENCE NUMBER  TO VARIATION DETAIL-EVIDENCE NUMBER
            MOVE  ZERO TO    EVIDENCE NUMBER-FLG
            END-IF
S4A007-EXIT
            EXIT
*
*CREDIT REFERENCE NUMBER
S4A008      SECTION
S4A008-010
            IF    REFERENCE NUMBER-FLG        =    '1'    OR    ZERO
            MOVE  REFERENCE NUMBER  TO VARIATION DETAIL-REFERENCE NUMBER
            MOVE  ZERO TO    REFERENCE NUMBER -FLG
            END-IF
S4A008-EXIT
            EXIT
*
*CREDIT OBTAINED DATE EDITION
S4A009      SECTION
S4A009-010
            IF    OBTAINED DATE-FLG           =    '1'    OR    ZERO
            MOVE  OBTAINED DATE  TO VARIATION DETAIL-OBTAINED DATE
            MOVE  ZERO TO    OBTAINED DATE-FLG
            END-IF
S4A009-EXIT
            EXIT
*
*CREDIT CITY CODE
S4A010      SECTION
S4A010-010
            IF    CITY CODE-FLG               =    '1'    OR    ZERO
            MOVE  CITY CODE  TO VARIATION DETAIL-CITY CODE
            MOVE  ZERO TO    CITY CODE-FLG
            END-IF
S4A010EXIT
            EXIT
*
*CREDIT USED PORTION EDITION
S4A011      SECTION
S4A011-010
            IF    USED PORTION-FLG            =    '1'    OR    ZERO
            MOVE  USE PORTION  TO  VARIATION DETAIL-USED PORTION
            MOVE  ZERO TO    USE PORTION-FLG
            END-IF
S4A011-EXIT
            EXIT
*
*CREDIT DURATION EDITION
S4A012      SECTION
S4A012-010
            IF    DURATION-FLG                =    '1'    OR    ZERO
            MOVE  DURATION  TO VARIATION DETAIL DURATION
            MOVE  ZERO TO    DURATION-FLG
            END-IF
```

```
S4A012-EXIT
          EXIT
*
*CREDIT ELIMINATION AND ADDITION REASON EDITION
S4A013    SECTION
S4A013-010
          IF     ELIMINATION AND ADDITION REASON-FLG  =      '1'     OR  ZERO
          MOVE '00'   TO VARIATION DETAIL-ELIMINATION AND ADDITION REASON
          MOVE ZERO   TO    ELIMINATION AND ADDITION REASON-FLG
          END-IF
S4A013-EXIT
          EXIT
*
*CREDIT ELIMINATION AND ADDITION EDITION
S4A014    SECTION
S4A014-010
          IF     ELIMINATION AND ADDITION-FLG         =      '1'     OR  ZERO
          MOVE '1'    TO VARIATION DETAIL-ELIMINATION AND ADDITION
          MOVE ZERO   TO    ELIMINATION AND ADDITION-FLG
          END-IF
S4A014-EXIT
          EXIT
*
*CREDIT AMOUNT EDITION
S4A015    SECTION
S4A015-010
          IF     AMOUNT-FLG          =     '1'     OR    ZERO
          MOVE AMOUNT       TO VARIATION DETAIL-AMOUNT
          MOVE ZERO   TO    AMOUNT-FLG
          END-IF
S4A015-EXIT
          EXIT
*
*CREDIT OBTAINED AMOUNT EDITION
S4A016    SECTION
S4A016-010
          IF     OBTAINED AMOUNT-FLG          =      '1'   OR   ZERO
          MOVE JOURNALIZING CREDIT BASE AMOUNT (CNT)
                TO VARIATION DETAIL-OBTAINED AMOUNT
          MOVE ZERO   TO    OBTAINED AMOUNT-FLG
          END-IF
S4A016-EXIT
          EXIT
*
*CREDIT PROJECT CODE EDITION
S4A018    SECTION
S4A018-010
          IF     PROJECT CODE-FLG             =      '1'   OR   ZERO
          CONTINUE
          ELSE
          GO     TO   S4A018-EXIT
          END-IF
          MOVE 1      TO   i
S4A018-020
```

```
                MOVE  PROJECT CODE (i)   TO VARIATION-DETAIL-PROJECT CODE (i)
                IF    i>     19
                MOVE  ZERO   TO    -FLG
                GO    TO     S4A018-EXIT
                ELSE
                COMPUTE i    =     i + 1
                GO    TO     S4A018-020
                END-IF
S4A018-EXIT
                EXIT
*
*CREDIT PROJECT DISTRIBUTION RATE EDITION
    S4A019      SECTION
    S4A019-010
                IF    PROJECT DISTRIBUTION-FLG    =    '1'    OR    ZERO
                CONTINUE
                ELSE
                GO    TO     S4A019-EXIT
                END-IF
                MOVE  1      TO    i
    S4A019-020
                MOVE  PROJECT DISTRIBUTION RATE (i)   TO          (i)
                IF    i>     19
                MOVE  ZERO   TO    -FLG
                GO    TO     S4A019-EXIT
                ELSE
                COMPUTE i    =     i + 1
                TO    TO     S4A019-020
                END-IF
S4A019-EXIT
                EXIT
*
*CREDIT CLOSE ACCOUNTING DATE EDITION
    S4A020-010
                IF    CLOSE ACCOUNTING DATE-FLG    =    '1'    OR    ZERO
                MOVE  CLOSE ACCOUNTING DATE
                      TO VARIATION DETAIL-CLOSE ACCOUNTING DATE
                MOVE  ZERO   TO    CLOSE ACCOUNTING DATE-FLG
                END-IF
S4A020-EXIT
                EXIT
*
*CREDIT INPUT NUMBER EDITION
    S4A021      SECTION
    S4A021-010
                IF    INPUT NUMBER-FLG    =    '1'    OR    ZERO
                MOVE  INPUT NUMBER TO VARIATION DETAIL-INPUT NUMBER
                MOVE  ZERO   TO    INPUT NUMBER-FLG
                END-IF
S4A021-EXIT
                EXIT
*
*CREDIT ROW NUMBER EDITION
    S4A022      SECTION
    S4A022-010
                IF    ROW NUMBER-FLG    =    '1'    OR    ZERO
```

```
                MOVE  ROW NUMBER TO VARIATION DETAIL-ROW NUMBER
                MOVE  ZERO  TO    ROW NUMBER-FLG
                END-IF
S4A022-EXIT
                EXIT
*
*CREDIT INDICATION REASON EDITION
S4A023          SECTION
S4A023-010
                IF    INDICATION REASON-FLG   =    '1'   OR   ZERO
                MOVE  INDICATION REASON  TO VARIATION DETAIL-INDICATION REASON
                MOVE  ZERO  TO    INDICATION REASON-FLG
                END-IF
S4A023-EXIT
                EXIT
*
*VARIATION DETAIL RECORD CREDIT WRITE
S5B001          SECTION
S5B001-010
                WRITE VARIATION DETAIL RECORD
                MOVE  '1'   TO    VARIATION DETAIL-FLG
S5B001-EXIT
                EXIT
*
*DEBIT DATA EDITION JUDGEMENT
S3C034          SECTION
S2C034-010
                IF    JOURNALIZING DEBIT BASE AMOUNT  (CNT)     =    ZERO
                MOVE  '1'   TO    DEBIT BASE AMOUNT-FLG
                END-IF
S2B029-EXIT
                EXIT
*
*VARIATION DETAIL OUTPUT AREA INITIALIZATION
S4B001          SECTION
S4B001-010
                IF    OUTPUT AREA-FLG          =    '1'   OR   ZERO
                INITIALIZE OUTPUT AREA
                MOVE  ZERO  TO    OUTPUT AREA-FLG
                END-IF
S4B001-EXIT
                EXIT
*
*DEBIT ORGANIZATION CODE EDITION
S4B003          SECTION
S4B003-010
                IF    ORGANIZATION CODE-FLG   =    '1'   OR   ZERO
                MOVE  ORGANIZATION CODE  TO VARIATION DETAIL-ORGANIZATION CODE
                MOVE  ZERO  TO    ORGANIZATION CODE-FLG
                END-IF
S4B003-EXIT
                EXIT
*
*DEBIT ACCOUNTING TITLE CODE EDITION
S4B004          SECTION
S4B004-010
```

```
                    IF      ACCOUNTING TITLE CODE-FLG    =    '1'   OR   ZERO
                    MOVE JOURNALIZING DEBIT ACCOUNTING TITLE CODE (CNT)
                            TO VARIATION DETAIL-ACCOUNTING TITLE CODE
                    MOVE ZERO  TO    ACCOUNTING TITLE CODE-FLG
                    END-IF
S4B004-EXIT
                    EXIT
*
*DEBIT ITEM CODE EDITION
  S4B005       SECTION
  S4B005-010
                    IF     ITEM CODE-FLG      =     '1'    OR    ZERO
                    MOVE ITEM CODE  TO VARIATION DETAIL-ITEM CODE
                    MOVE ZERO  TO    ITEM CODE-FLG
                    END-IF
S4B005-EXIT
                    EXIT
*
*DEBIT CONCRETE NAME CODE EDITION
  S4B006       SECTION
  S4B006-010
                    IF     CONCRETE NAME CODE-FLG    =    '1'    OR    ZERO
                    MOVE CONCRETE NAME CODE  TO VARIATION DETAIL-CONCRETE NAME
CODE
                    MOVE ZERO  TO  CONCRETE NAME CODE-FLG
                    END-IF
S4B006-EXIT
                    EXIT
*
*DEBIT EVIDENCE NUMBER EDITION
  S4B007       SECTION
  S4B007-010
                    IF     EVIDENCE NUMBER-FLG     =     '1'    OR    ZERO
                    MOVE EVIDENCE NUMBER  TO VARIATION DETAIL-EVIDENCE NUMBER
                    MOVE ZERO  TO    EVIDENCE NUMBER-FLG
                    END-IF
S4B007-EXIT
                    EXIT
*
*DEBIT REFERENCE NUMBER EDITION
  S4B008       SECTION
  S4B008-010
                    IF     REFERENCE NUMBER-FLG    =     '1'    OR    ZERO
                    MOVE REFERENCE NUMBER  TO  VARIATION DETAIL-REFERENCE NUMBER
                    MOVE ZERO  TO    REFERENCE NUMBER-FLG
                    END-IF
S4B008-EXIT
                    EXIT
*
*DEBIT OBTAINED DATE
  S4B009       SECTION
  S4B009-010
                    IF     OBTAINED DATE-FLG     =     '1'    OR    ZERO
                    MOVE OBTAINED DATE  TO VARIATION DETAIL-OBTAINED DATE
                    MOVE ZERO  TO    OBTAINED DATE-FLG
                    END-IF
```

```
S4B009-EXIT
          EXIT
*
* DEBIT CITY CODE EDITION
S4B010    SECTION
S4B010-010
          IF    CITY CODE-FLG            =      '1'    OR    ZERO
          MOVE  CITY CODE  TO VARIATION DETAIL-CITY CODE
          MOVE  ZERO  TO    CITY CODE-FLG
          END-IF
S4B010-EXIT
          EXIT
*
*DEBIT USE PORTION EDITION
S4B011    SECTION
S4B011-010
          IF    USE PORTION-FLG          =      '1'    OR    ZERO
          MOVE  USE PORTION  TO  VARIATION DETAIL-USE PORTION
          MOVE  ZERO  TO    USE PORTION-FLG
          END-IF
S4B011-EXIT
          EXIT
*
*DEBIT DERATION EDITION
S4B012    SECTION
S4B012-010
          IF    DURATION-FLG             =      '1'    OR    ZERO
          MOVE  DURATION  TO VARIATION DETAIL-DURATION
          MOVE  ZERO  TO    DURATION-FLG
          END-IF
S4B012-EXIT
          EXIT
*
* DEBIT ELIMINATION AND ADDITION REASON EDITION
S4B013    SECTION
S4B013-010
          IF    ELIMINATION AND ADDITION REASON-FLG = '1' OR  ZERO
          MOVE  '00'  TO VARIATION DETAIL-ELIMINATION AND ADDITION REASON
          MOVE  ZERO  TO    ELIMINATION AND ADDITION REASON-FLG
          END-IF
S4B013-EXIT
          EXIT
*
* DEBIT ELIMINATION AND ADDITION EDITION
S4B014    SECTION
S4B014-010
          IF    ELIMINATION AND ADDITION-FLG  =    '1'    OR    ZERO
          MOVE  '1'   TO VARIATION DETAIL-ELIMINATION AND ADDITION
          MOVE  ZERO  TO    ELIMINATION AND ADDITION-FLG
          END-IF
S4B014-EXIT
          EXIT
*
*DEBIT AMOUNT EDITION
S4B015    SECTION
S4B015-010
```

```
                IF      AMOUNT-FLG       =      '1'    OR     ZERO
                MOVE AMOUNT  TO  VARIATION DETAIL-AMOUNT
                MOVE ZERO    TO  AMOUNT-FLG
                END-IF
S4B015-EXIT
                EXIT
*
*DEBIT OBTAINED AMOUNT  EDITION
S4B016          SECTION
S4B016-010
                IF      OBTAINED AMOUNT-FLG    =      '1'    OR     ZERO
                MOVE JOURNALIZING DEBIT BASE AMOUNT (CNT)
                      TO  VARIATION DETAIL-OBTAINED AMOUNT
                MOVE ZERO    TO    OBTAINED AMOUNT-FLG
                END-IF
S4B016-EXIT
                EXIT
*
*DEBIT PROJECT CODE EDITION
S4B018          SECTION
S4B018-010
                IF      PROJECT CODE-FLG       =      '1'    OR     ZERO
                CONTINUE
                ELSE
                GO      TO      S4B018-EXIT
                END-IF
                MOVE 1   TO   i
S4B018-020
                MOVE PROJECT CODE(i)    TO      (i)
                IF      i       >       19
                MOVE ZERO   TO    PROJECT CODE-FLG
                GO      TO      S4B018-EXIT
                ELSE
                COMPUTE i   =    i + 1
                GO      TO      S4B018-020
                END-IF
S4B018-EXIT
                EXIT
*
*DEBIT PROJECT CODE DISTRIBUTION RATE EDITION
S4B019          SECTION
S4B019-010
                IF      PROJECT DISTRIBUTION RATE-FLG   =      '1'    OR     ZERO
                CONTINUE
                ELSE
                GO      TO      S4B019-EXIT
                END-IF
                MOVE 1   TO   i
S4B019-020
                MOVE PROJECT DISTRIBUTION RATE (i)    TO      (i)
                IF      i       >       19
                MOVE ZERO   TO    PROJECT DISTRIBUTION RATE-FLG
                GO      TO      S4B019-EXIT
                ELSE
                COMPUTE i   =    i + 1
                GO      TO      S4B019-020
```

```
                    END-IF
S4B019-EXIT
                    EXIT
*
* DEBIT CLOSE ACCOUNTING DATE EDITION
S4B020      SECTION
S4B020-010
            IF      CLOSE ACCOUNTING DATE-FLG    =    '1'    OR    ZERO
            MOVE    CLOSE ACCOUNTING DATE
                    TO VARIATION-DETAIL CLOSE ACCOUNTING DATE
            MOVE    ZERO    TO    CLOSE ACCOUNTING DATE-FLG
            END-IF
S4B020-EXIT
            EXIT
*
*DEBIT INPUT NUMBER EDITION
S4B021      SECTION
S4B021-010
            IF      INPUT NUMBER-FLG    =    '1'    OR    ZERO
            MOVE    INPUT NUMBER  TO VARIATION DETAIL-INPUT NUMBER
            MOVE    ZERO    TO    INPUT NUMBER-FLG
            EDIT-IF
S4B021-EXIT
            EXIT
*
*DEBIT ROW NUMBER
S4B022      SECTION
S4B022-010
            IF      ROW NUMBER-FLG    =    '1'    OR    ZERO
            MOVE    ROW NUMBER  TO VARIATION DETAIL-ROW NUMBER
            MOVE    ZERO    TO    ROW NUMBER-FLG
            END-IF
S4B022-EXIT
            EXIT
*
*DEBIT INDICATION REASON EDITION
S4B023      SECTION
S4B023-010
            IF      INDICATION REASON-FLG    =    '1'    OR    ZERO
            MOVE    INDICATION REASON  TO VARIATION DETAIL-INDICATION REASON
            MOVE    ZERO    TO    INDICATION REASON-FLG
            END-IF
S4B023-EXIT
            EXIT
*
*VARIATION DETAIL RECORD DEBIT WRITE
S5C001      SECTION
S5C001-010
            WRITE VARIATION DETAIL
            MOVE '1'    TO    VARIATION DETAIL-FLG
S5C001-EXIT
            EXIT
```

What is claimed is:

1. A computer system for establishing an application adapted dedicated system operable on a plurality of data items for performing a plurality of functional processes for said data items, comprising:

an arithmetic means for performing processes defined by an on-going program describing manner and schedule of signal processing;

a memory means for storing a plurality of information, said memory means including a first storage means for storing a plurality of program segments, each of program segments having an elemental single process which can be completed through execution of the corresponding program segment and a unique identifier thereof, and being executable independent of other program segments for completely performing the contained elemental single process, and a second storage means for storing at least one governing program for systematically establishing interrelationship between respective of said program segments for sequential operation thereof required in a target source program; and means for triggering said governing program for systematic execution of said target source program by executing respective of said program segments by said arithmetic means in a manner governed by said governing program.

2. A computer system for establishing an application adapted dedicated system operable on a first data item and a second data item for performing a functional process for respective of said first and second data items, said functional process being constituted of a sequence of first and second elementary processes each including single self-completing process, comprising:

an arithmetic means for performing processes defined by an on-going program describing manner and schedule of signal processing;

a memory means for storing a plurality of information, said memory means including a first storage means for storing a plurality of program segments, each of program segments having an identifier for identifying one of said first and second data items and containing one of said first and second elemental processes which can be completed through execution of the corresponding program segment and a unique identifier thereof, and being executable independent of other program segments, and a second storage means for storing at least one governing program for systematically establishing interrelationship between respective of said program segments for sequential operation thereof for performing said functional process for completely performing the contained elemental signal process; and means for triggering said governing program for systematic execution of respective of said program segments by said arithmetic means in a manner governed by said governing program for performing sequence of processes required in a target source program.

3. A computer system as set forth in claim 2, wherein said first and second data items correspond to data items in a data file to be handled.

4. A computer system as set forth in claim 2, wherein said first elementary process is a data check process.

5. A computer system as set forth in claim 2, wherein said first elementary process is a write-in process for writing a data of the corresponding data item in a data file.

6. A computer system as set forth in claim 2, wherein said first elementary process is an arithmetic process for performing calculation for a data of the corresponding data item with another data of another data item.

7. A computer system for establishing an application adapted dedicated system operable on a first data item and a second data item for performing a functional process for respective of said first and second data items, said functional process being constituted of a sequence of first and second elementary processes each of which have possible minimum processing step of a target program, comprising:

an arithmetic means for performing processes defined by an on-going program describing manner and schedule of signal processing;

a memory means for storing a plurality of information, said memory means including a first storage means for storing a plurality of program segments, each of program segments having an identifier for identifying one of said first and second data items and containing one of said first and second elementary processes which can be completed through execution of the corresponding program segment and a unique identifier thereof, and being executable independent of other program segments, and a second storage means for storing at least one governing program for systematically establishing interrelationship between respective of said program segments for sequential operation thereof for performing said functional process for completely performing the contained elementary signal process; and means for triggering said governing program for systematic execution of respective of said program segments by said arithmetic means in a manner governed by said governing program for performing sequence of processes required in a target source program.

8. A method for establishing an application adapted dedicated computer system, operable on a plurality of data items for performing a plurality of functional processes for said data items, comprising the steps of:

establishing a plurality of program segments, each of which contains a single process to be completed through execution of the corresponding program segment with requiring execution of any other program segment, and a unique identifier thereof; and establishing a governing program for establishing systematic interrelationship between said program segments for performing a sequence of processes adapted to a targeted dedicated application to be executed by said dedicated computer system.

* * * * *